United States Patent
Shibata et al.

(10) Patent No.: US 10,212,364 B2
(45) Date of Patent: Feb. 19, 2019

(54) ZOOM CONTROL APPARATUS, IMAGE CAPTURING APPARATUS AND ZOOM CONTROL METHOD

(71) Applicant: CANON KABUSHIKI KAISHA, Tokyo (JP)

(72) Inventors: Masahiro Shibata, Tokyo (JP); Tomohiro Sugaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 15/377,599

(22) Filed: Dec. 13, 2016

(65) Prior Publication Data

US 2017/0171475 A1  Jun. 15, 2017

(30) Foreign Application Priority Data

Dec. 15, 2015  (JP) ................................ 2015-243958
Dec. 17, 2015  (JP) ................................ 2015-246407
Nov. 28, 2016  (JP) ................................ 2016-229830

(51) Int. Cl.
*H04N 5/262*  (2006.01)
*H04N 5/232*  (2006.01)

(52) U.S. Cl.
CPC ....... *H04N 5/2628* (2013.01); *H04N 5/23254* (2013.01); *H04N 5/23287* (2013.01)

(58) Field of Classification Search
None
See application file for complete search history.

(56) References Cited

U.S. PATENT DOCUMENTS

| | | | | |
|---|---|---|---|---|
| 2005/0018159 A1* | 1/2005 | Van Buel | ............... | G03F 9/7003 355/52 |
| 2008/0151078 A1* | 6/2008 | Konno | ................... | G01S 3/7864 348/240.99 |
| 2013/0027510 A1* | 1/2013 | Tsubusaki | .......... | H04N 5/23212 348/36 |

FOREIGN PATENT DOCUMENTS

| JP | 08-029826 A | 2/1996 |
|---|---|---|
| JP | 2009-088860 A | 4/2009 |
| JP | 2015-089108 A | 5/2015 |
| JP | 2015-102853 A | 6/2015 |

\* cited by examiner

*Primary Examiner* — Mark T Monk
(74) *Attorney, Agent, or Firm* — Cowan, Liebowitz & Latman, P.C.

(57) ABSTRACT

The zoom control apparatus configured to control an angle of view. The apparatus includes a motion acquirer configured to acquire a motion amount of an image capturing optical system, a calculator configured to calculate a displacement amount of a main object image in a captured image by using the motion amount of the image capturing optical system, a determiner configured to determine whether or not the displacement amount of the main object image is larger than a first threshold, and a controller configured to perform, when the displacement amount of the main object image is larger than the first threshold, control for making the angle of view wider than that for when the displacement amount of the main object image is smaller than the first threshold.

24 Claims, 13 Drawing Sheets

ZOOM CONTROL APPARATUS, IMAGE CAPTURING APPARATUS AND ZOOM CONTROL METHOD

BACKGROUND OF THE INVENTION

Field of the Invention

The present invention relates to a zoom control technique.

Description of the Related Art

Image capturing apparatuses include ones provided with an optical zoom function of moving a zoom lens, an electronic zoom function of enlarging part of a captured image or both the optical and electronic zoom functions. Such image capturing apparatuses for not only professional use but also consumer use recently have a high zoom magnification. When an inexperienced user uses such a high zoom magnification image capturing apparatus to perform a telephoto image capturing, it is difficult for this user to capture an object and is often likely to cause an instant frame out of the object. Japanese Patent Laid-Open No. 2015-102853 discloses an image capturing apparatus (camera) that detects a motion amount of the camera and automatically performs a zoom out toward a wide-angle side when determining that a user operates the camera for searching for an object. Such a zooming assist control function of assisting user's framing by a zoom out (by widening an image capturing angle of view) in response to a motion of the camera is hereinafter referred to as "a framing assist zoom function (or simply a framing assist zoom)" and abbreviated as "an FA zoom function (or simply an FA zoom)". A zoom in (that is, returning a zoom position to an original position) from a zoom-out state where the image capturing angle of view is widened by the FA zoom is also included in the FA zoom.

SUMMARY OF THE INVENTION

The present invention provides as an aspect thereof a zoom control apparatus configured to control an angle of view. The apparatus includes a motion acquirer configured to acquire a motion amount of an image capturing optical system used for image capturing of a main object, a calculator configured to calculate a displacement amount of a main object image in a captured image by using the motion amount of the image capturing optical system, a determiner configured to determine whether or not the displacement amount of the main object image is larger than a first threshold, and a controller configured to perform, when the displacement amount of the main object image is larger than the first threshold, control for making the angle of view wider than that for when the displacement amount of the main object image is smaller than the first threshold.

The present invention provides as another aspect thereof a zoom control apparatus configured to control an angle of view. The apparatus includes a motion acquirer configured to acquire a motion amount of an image capturing optical system, and a controller configured to vary the angle of view. The controller is configured to acquire a first value that is a velocity or an acceleration as a value relating to the motion amount, acquire a second value that is a value relating to a moved amount of a motion of the image capturing optical system from a time at which the first value becomes equal to or higher than a third threshold and make the angle of view wider in response to the second value becoming equal to or larger than a fourth threshold.

The present invention provides as yet another aspect thereof an image capturing apparatus including the zoom control apparatus and an image sensor configured to perform image capturing with the angle of view.

The present invention provides as still another aspect thereof a zoom control method of controlling an angle of view. The method includes a step of acquiring a motion amount of an image capturing optical system used for image capturing of a main object, a step of calculating a displacement amount of a main object image in a captured image by using the motion amount of the image capturing optical system, a step of determining whether or not the displacement amount of the main object image is larger than a first threshold, and a step of performing, when the displacement amount of the main object image is larger than the first threshold, control for making the angle of view wider than that for when the displacement amount of the main object image is smaller than the first threshold.

Further features of the present invention will become apparent from the following description of exemplary embodiments (with reference to the attached drawings).

DESCRIPTION OF THE EMBODIMENTS

Exemplary embodiments of the present invention will hereinafter be described with reference to the accompanying drawings.

Each of embodiments described below relates to a zoom control apparatus configured to perform a zoom out in response to a motion of an image capturing apparatus.

The zoom control apparatus of each embodiment sets conditions for performing the zoom out in detail to enable performing a zoom control depending on a user's intention. A first embodiment (Embodiment 1) and a second embodiment (Embodiment 2) will describe an image capturing apparatus including a zoom control apparatus configured to perform the zoom out based on a displacement amount of an object image in a captured image. A third embodiment (Embodiment 3) will describe an image capturing apparatus including a zoom control apparatus configured to perform the zoom out in response to a large motion of the image capturing apparatus.

Embodiment 1

This embodiment will describe, as mentioned above, the image capturing apparatus including the zoom control apparatus configured to perform the zoom out based on the displacement amount of the object image in the captured image. The FA zoom function disclosed in Japanese Patent Laid Open 2015-102853 has a difficulty is appropriately determining, when the motion amount of the image capturing apparatus does not coincide with the displacement amount of the object image in the captured image, whether or not to perform the zoom out. Thus, the zoom out is likely not to be performed at user's desired timing. For example, during an electronic zoom a user may lose an object (main object to be captured) because the displacement amount of the object image (main object image) in the captured image is large with respect to a small motion of the image capturing apparatus. Accordingly, it is desirable that the FA zoom be more easily activated when the electronic zoom is performed than when the electronic zoom is not performed. On the other hand, since the user can relatively easily capture a moving object that moves in a fixed direction at a fixed speed, when the user well captures the object, the displacement amount of the object image in the captured image is not so large with respect to the motion of the image capturing apparatus. That is, even though the motion amount of the image capturing apparatus is large, when the displacement amount of the object image in the captured image is small, it is desirable that the FA zoom be not activated. Thus, this embodiment determines depending on the displacement amount of the object image in the captured image whether or not to perform the zoom out, which facilitates the zoom control depending on the user's intention. This embodiment will specifically describe constituent parts of the image capturing apparatus including the zoom control apparatus and operations of these constituent parts.

Figure 1:
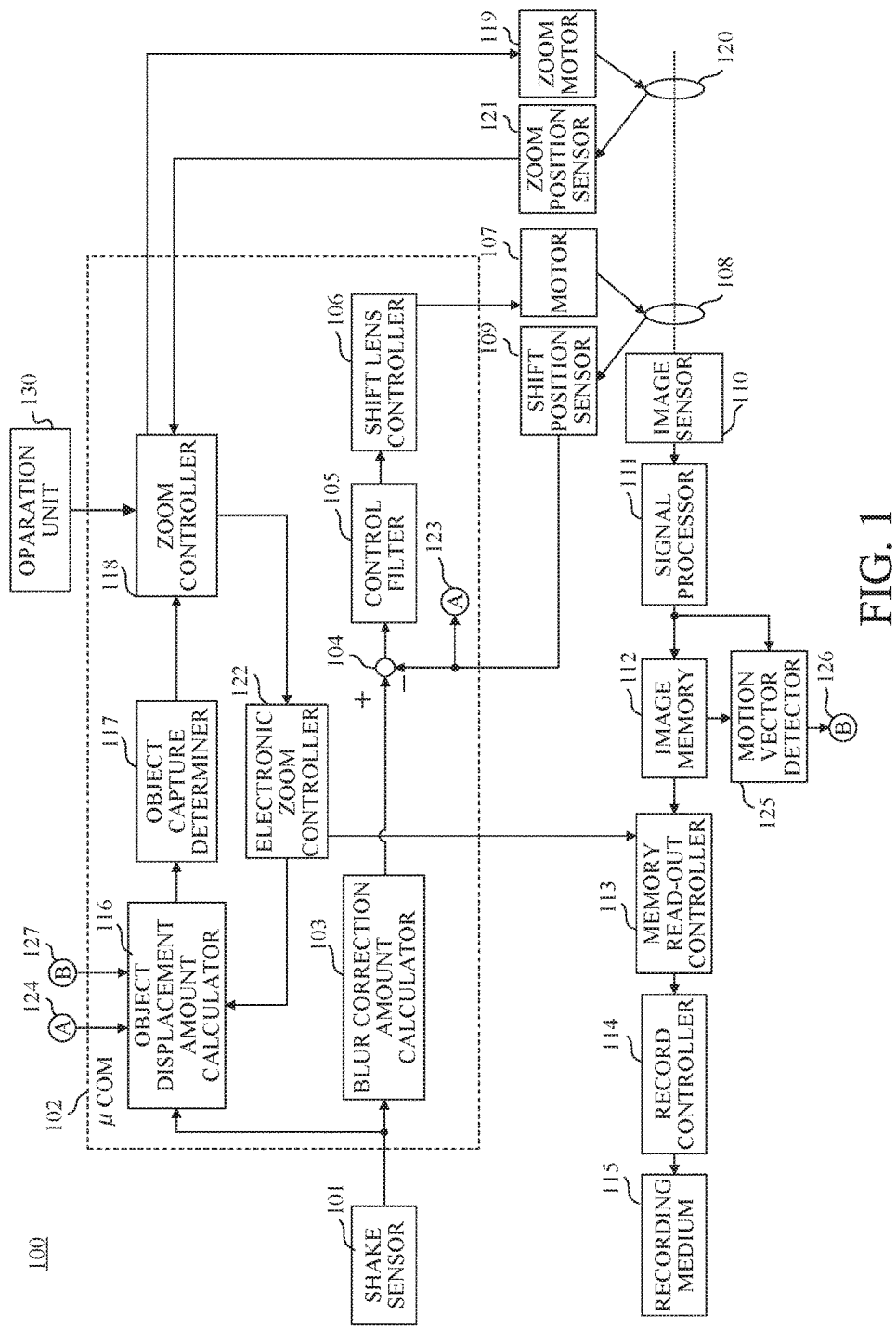
FIG. 1 is a block diagram illustrating a configuration of an image capturing apparatus that is Embodiment 1 of the present invention.

FIG. 1 illustrates a configuration of an image capturing apparatus 100 having the FA zoom function. The mage capturing apparatus 100 is provided with an image blur correction function of correcting image blur due to a hand jiggling and the like. The mage capturing apparatus 100 calculates a motion amount thereof by using information on a shake of the image capturing apparatus detected for correcting the image blur. Although in this embodiment the FA zoom function and the image blur correction function share a shake detector for detecting the shake, a motion amount detector dedicated for the FA zoom function may be provided. Thus, the FA zoom function can be realized without the image blur correction function.

Prior to description of the FA zoom function, description will be made of the image blur correction function. A shake sensor 101 as a motion acquirer is configured to detect a shake applied to the image capturing apparatus 100 (that is, to an image capturing optical system thereof). The shake sensor 101 is constituted by an angular velocity sensor such as a vibrating gyroscope and is configured to detect an angular velocity (motion velocity) as a first value relating to motions in a yaw direction and a pitch direction. The snake sensor 101 outputs a shake detection signal indicating the detected angular velocity to a microcomputer (µCOM) 102. The microcomputer 102 acquires the shake detection signal to perform signal processing thereon. FIG. 1 illustrates processes performed by the microcomputer 102 in a block diagram form. A blur correction amount calculator 103 in a microcomputer 102 integrates the detected angular velocity in each of the yaw and pitch directions to calculate an angular motion amount in each of the yaw and pitch directions and acquires a blur correction amount from the angular motion amount in each of the yaw and pitch directions.

The blur correction amount corresponds to a drive amount of a blur correction mechanism 108 to cancel out image blur in a captured image. Specifically, the blur correction amount calculator 103 includes an integrator that integrates an angular velocity signal as the shake detection signal output from the shake sensor 101 to output an angular motion signal to a subtractor 104. The integrator integrates the angular velocity signals in the yaw and pitch directions and thereby outputs the angular motion signals in the yaw and pitch directions. The subtractor 104 subtracts, from the angular motion signals output from the blur correction amount calculator 103, position data of the blur correction mechanism 108 described below to acquire deviation data and then outputs the deviation data to a control filter 105. The control filter 105 performs, on the deviation data acquired from the subtractor 104, signal processing using an amplifier and a phase compensation filter.

The control filter 105 outputs a signal indicating the processed deviation data to a shift lens controller 106. The shift lens controller 106 controls a motor 107 in response to the output from the control filter 105 to control drive of a shift lens (blur correction lens) in the blur correction mechanism 108. Specifically, the shift lens controller 106 modulates a motor control amount to a SUM (pulse width modulation) waveform for changing a duty ratio of a pulse signal to drive the motor 107. The motor 107 is, for example, a voice coil motor. The drive of the motor 107 moves the shift lens in the blur correction mechanism 108 in directions different, from an optical axis direction (for example, directions orthogonal to an optical axis of the image capturing optical system). The shift lens controller 106 performs a feedback control such that the movement (shift) of the shift lens decreases the deviation data from the subtractor 104 to 0.

This embodiment describes as an example the blur correction mechanism 108 that includes the shift lens movable in the directions different from the optical axis direction. In FIG. 1, the blur correction mechanism 108 and an image sensor 110 are separate from each other. However, in an alternative embodiment, the blur correction mechanism 108 may have a configuration in which the image sensor 110 is held by a movable unit and movable in the directions different from the optical axis direction. In this case, a movement control of the movable unit including the image sensor 110 enables image blur correction. The blur correction mechanism 108 may perform an electronic image blur correction (electronic image stabilization). The electronic image blur correction changes a position of a clipped area in the captured image acquired by the image sensor 110 to perform the image blur correction.

A shift position sensor 109 is constituted by a magnet and a magnetic detection element (hall element) disposed so as to face the magnet. The shift position sensor 109 detects a shift amount (i.e., a movement amount in the direction orthogonal to the optical axis direction) of the shift lens in the blur correction mechanism 108 to output a shift amount detection signal to the subtractor 104.

This configuration constitutes a feedback control system causing the shift lens to shift in the direction orthogonal to the optical axis direction with respect to the output from the blur correction amount calculator 103 so as to follow a target position. With the feedback control system, the shift lens is shifted by a shift amount corresponding to the blur correction amount to correct the image blur due to the shake of the image capturing apparatus 100. On an image capturing surface of the image sensor 110, an object image whose blur in each of the yaw (horizontal) and pitch (vertical) directions is corrected is formed. The image sensor 110 photoelectrically converts the object image (optical image) formed by the image capturing optical system including the blur correction mechanism 108 and a zoom lens 120 to output an image capturing signal (image signal).

The image capturing optical system may be integrally provided in a lens-integrated image capturing apparatus and may be interchangeably attachable to a lens-interchangeable image capturing apparatus. A signal processor 11 processes the image capturing signal acquired from the image sensor 110. The image processor 111 produces a video signal (frame images) compliant with NTSC (National Television System Committee) to output the video signal to an image memory 112 and a motion vector detector 125. The signal processor 111 may perform, on the image capturing signal from the image sensor 110, various processes such as CDS (correlated double sampling), AGC (automatic gain control), A/D conversion, gamma correction and white balance.

A memory read-out controller 113 sets a read-out position and a read-out area of image data stored in the image memory 112. For example, the memory read-out controller 113 sets, when the electronic zoom is performed, a large or small read-out area of the image data. A record controller 114 controls recording of data read out from the image memory 112 by the memory read-out controller 113. The record controller 114 controls, in response to a user's instruction operation at an operation unit 130 for recording the video signal, recording of the data read out from the image memory 112 to a recording medium 115. The recording medium 115 is, for example, a semiconductor medium such as a flash memory or a magnetic recording medium such as a hard disk.

Next, description will be made of the FA zoom function. The zoom control apparatus in this embodiment is constituted by the shake sensor 101 and the microcomputer 102.

In this embodiment, the microcomputer 102 includes, in addition to the blur correction amount calculator 103, the subtractor 104, the control filter 105 and the shift lens controller 106 described above, an object displacement amount calculator 116 as a calculator, an object capture determiner 117 as a determiner, a zoom controller 118 as a controller and an electronic zoom controller 122.

The shake sensor 101 detects the shake of the image capturing apparatus 100 to output the shake detection signal (angular velocity signal) to the object displacement amount calculator (hereinafter simply referred to as "a displacement amount calculator") 116. The displacement amount calculator 116 calculates a displacement amount of the object image, as described later in detail. The object capture determiner (hereinafter simply referred to as "a capture determiner") 117 acquires the displacement amount of the object image from the displacement amount calculator 116 and compares the acquired displacement amount with a first threshold. The first threshold is used for determining whether or not to perform the zoom out. The capture determiner 117 determines an object capturing state depending on whether or not the displacement amount of the object image is larger than the first threshold. The object capturing state is a state indicating a determination result that the user is capturing the object through the image capturing apparatus 100 (in other words, the image capturing apparatus 100 is capturing the object) or the user is searching for the object. The displacement amount of the object image calculated by the displacement amount calculator 116 is a value indicating, for example, a positional change of the object image on the image sensor 110 in pixels. The first threshold is a limit value of an image capturing resolution. The zoom controller 118 acquires the determination result from the capture determiner 117 to output a drive signal for the zoom out or zoom in to zoom motor 119. Specifically, when the image capturing apparatus 100 is in a zoom-out state and the determination result that the image capturing apparatus 100 is capturing the object is input from the capture determiner 117, the zoom controller 118 outputs the drive signal for the zoom in to the zoom motor 119. On the other hand, when the image capturing apparatus 100 is in a zoom-in state (where the FA zoom is inactive) and the determination result that the user is searching for the object is input from the capture determiner 117, the zoom controller 118 outputs the drive signal for the zoom out to the zoom motor 119.

When the image capturing apparatus 100 is in the zoom-out state and the determination result that the user is searching for the object is input from the capture determiner 117, the image capturing angle of view not varied. Similarly, when the image capturing apparatus 100 is in the zoom-in state and the determination result that the image capturing apparatus 100 is capturing the object is input from the capture determiner 117, the image capturing angle of view is not varied.

The zoom motor 119 is constituted by, for example, a stepping motor. A rotor of the zoom motor 119 rotates a lead screw and thereby the zoom lens 120 moved in the optical axis direction. The zoom controller 118 produces (calculates) the drive signal including a number of pulses required to move the zoom lens 120 to a target position and supplies the drive signal to the zoom motor 119. The zoom controller 118 may supply to the zoom motor 119 the drive signal until a zoom position sensor 121 configured to detect a position of the zoom lens 120 detects that the zoom lens 120 reaches the target position.

In the following description, the zoom out performed by the zoom controller 118 activating the FA zoom function is referred to as "an FA zoom out" (zoom-out control), and the zoom in performed to return from the zoom-out state after the FA zoom out to a telephoto state referred to as "an FA zoom in" (zoom-in control). In this embodiment, the FA zoom out is performed as the zoom out in response to the determination result from the capture determiner 117.

The zoom lens 120 is held by a holding frame to which a position scale (not illustrated) for detecting the position of the zoom lens 120 is fixed. A lens barrel portion (not illustrated) is provided with the zoom position sensor 121 fixed thereto so as to face the position scale. The position scale includes a scale pattern formed in the optical axis direction. The scale pattern is a magnetic pattern or an optical reflective pattern. The zoom position sensor 121 magnetically or optically reads the scale pattern that is moved with the zoom lens 120 to output a position detection signal indicating the position of the zoom lens 120. The position detection signal from the zoom position sensor 121 is input to the zoom controller 118 to be used for position control of the zoom lens 120. The shift position sensor 109 also supplies the position detection signal to the displacement amount calculator 116. In FIG. 1, A terminals 123 and 124 each illustrated by a circled A are electrically connected to each other.

The shift lens controller 106 controls the shift of the shift lens with respect to the motion of the image capturing apparatus 100 to reduce image motion (image blur). The displacement amount of the object image is calculated by subtracting a movement amount of an image capturing area associated with the shift of the shift lens from a movement amount of the image capturing area associated with the motion of the image capturing apparatus 100.

The image capturing apparatus 100 can perform the electronic zoom (that is, has an electronic zoom function). An electronic zoom controller 122 controls the electronic zoom performed by image processing, in other words, performs an electronic zoom control. When the electronic zoom function active, the zoom controller 118 calculates an electronic zoom magnification to output the calculation result to the electronic zoom controller 122. The electronic zoom controller 122 instructs, depending on the electronic zoom magnification, an image read-out area to the memory read-out controller 113. The electronic zoom controller 122 further outputs the electronic zoom magnification to the displacement amount calculator 116. The electronic zoom control performs a process to shift the clipped area in the captured image corresponding to the image read-out area. When an image clipped (read-out) by this process is enlarged when displayed, with respect to the same motion of the image capturing apparatus 100, the displacement amount of the object image in the captured image becomes larger than that when the electronic zoom control is inactive. Thus, the displacement amount calculator 116 corrects the movement amount of the image capturing area associated with the motion of the image capturing apparatus by using the electronic zoom magnification and calculates the corrected displacement amount as the displacement amount of the object image. The correction using the electronic zoom magnification will be described below.

Activation and inactivation of the electronic zoom function can be selected the user through a menu setting or the like on a display screen.

The motion vector detector 125 acquires a current frame image produced by the signal processor 111 and a one-previous frame image stored in the image memory 112 and detects motion vectors between these frame images using their luminance signals. The motion vectors can be detected by using, for example, a block matching method. The block matching method divides each of the current and one-previous frame images into multiple areas called "blocks" and detects similar portions in the current and one-previous frame images in a block-by-block basis. The method detects, in an arbitrary area of the one-previous frame image, a similar block where a correlation value with an arbitrary block in the current frame image is maximum. The method further detects, from a displacement amount between positions of the arbitrary block in the current frame image and the similar block in the one-previous frame image, the motion vector that is motion information between the frame images. The motion vector detector 125 may use other motion vector detection methods than the block matching method.

The motion vector detector 125 outputs the detected motion vector to the displacement amount calculator 116. In FIG. 1, B terminals 126 and 127 each illustrated by a circled B are electrically connected to each other. In an image capturing state where the FA zoom is active, an increase of the displacement amount of the object image automatically activates the zoom out. On the other hand, when the user selects an image capturing state where the EA zoom inactive, such an increase of the displacement amount of the object image does not automatically activate the zoom out. Activation and inactivation of the FA zoom can be selected by a user's operation in an operation unit 130. The operation unit 130 includes operation switches, operation buttons, a touch panel and others and receives user's operations such as a menu setting operation, a zoom key operation, a motion image capturing start operation and a still image capturing instruction operation. The operation unit 130 further receives a user's operation for stopping the FA zoom out. As the user's operation for stopping the zoom out, the zoom key operation instructing the zoom in and the zoom out when the FA zoom function is inactive may be used.

Figure 2A:
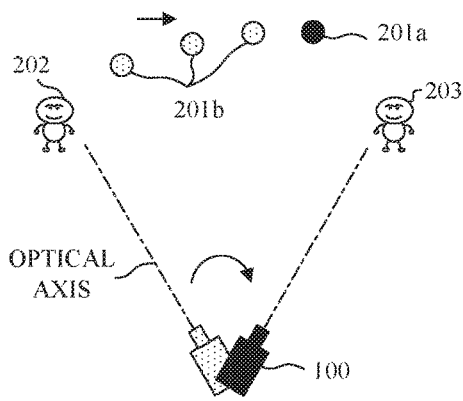
FIGS. 2A to 2C schematically illustrate an FA zoom.
Figure 2B:
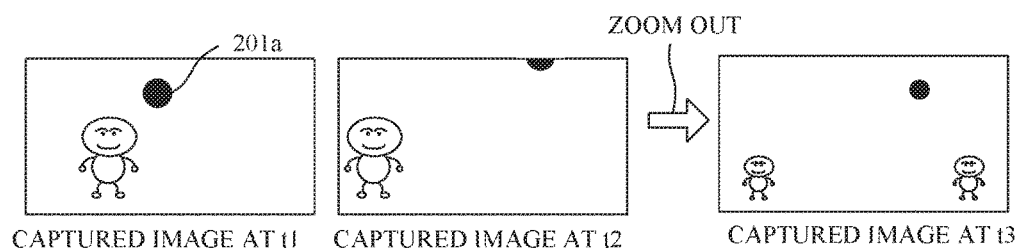
Figure 2C:
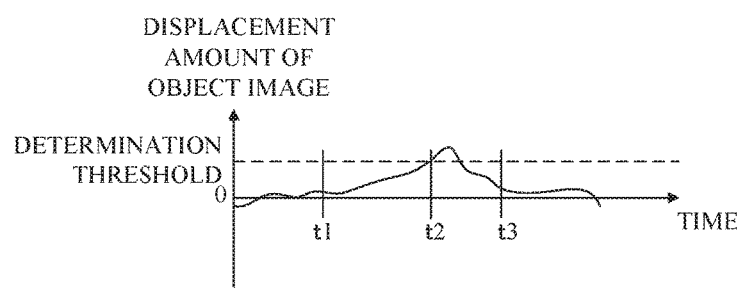

Description will be made of examples of the FA zoom with referring to FIGS. 2A to 2C. FIG. 2A illustrates a state where the user moves the image capturing apparatus 100 from left to right in the drawing so as to capture a ball 201 that is a moving main object. The image capturing apparatus 100 is capturing not only the ball 201 but also objects 202 and 203. In FIG. 2A, the ball 201 is moving; a current ball 201a is illustrated by a black circle and a past ball 201b is illustrated by a shaded circle. FIG. 2B illustrates captured images acquired in the state illustrated in FIG. 2A. FIG. 2C illustrates temporal changes of the displacement amount of the object image.

Times t1, t2 and t3 illustrated in FIGS. 2B and 2C have a relation of "t1<t2<t3".

Until the time t1, the user hardly moves the image capturing apparatus 100 and thereby the displacement amount of the object image is around 0. When the ball 201 is thrown at the time t1, the user moves the image capturing apparatus 100 so as to capture the ball 201 and thereby the displacement amount begins to increase.

Then, at the time t2, the displacement amount of the object image exceeds a determination threshold as the first threshold. The determination threshold has a relation with the displacement amount of the object image such that, as illustrated in FIG. 2B, the displacement amount exceeds the determination threshold when the image capturing apparatus 100 is likely to become unable to capture the moving main object moving toward outside of the image capturing angle of view. The capture determiner 117 determines that, at the time t2 at which the displacement amount of the object image becomes equal to or larger than the determination threshold, a current state is a searching state where the user is searching for the main object. The zoom controller 118 performs the zoom out in response to that determination result, and thereby the image capturing angle of view becomes a wide-angle at the time t3 after the time t2. Such an increase of the image capturing angle of view makes the displacement amount of the main object with respect to the motion of the image capturing apparatus 100 small, and thereby the motion of the image capturing apparatus 100 becomes small. Therefore, as illustrated in FIG. 2C, after the displacement amount of the object image reaches its peak value after the time t2, the displacement amount of the object image gradually decreases.

Figure 3:
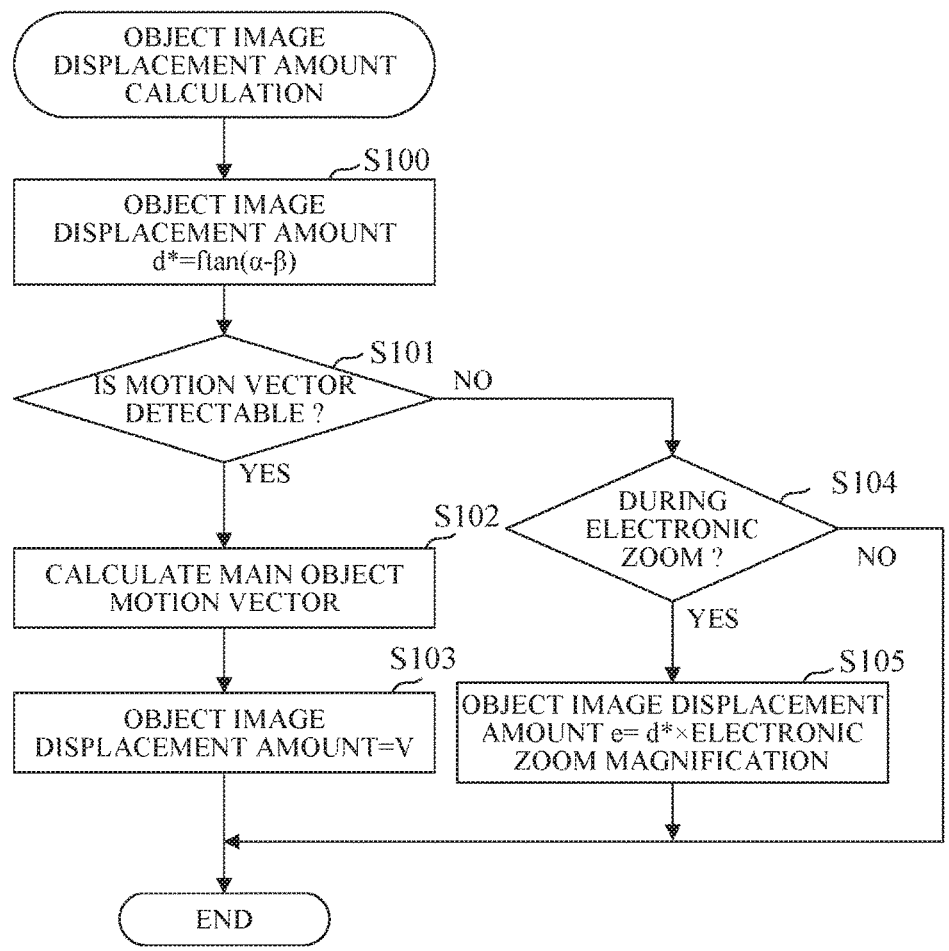
FIG. 3 is a flowchart illustrating an object displacement amount calculating process performed by a displacement amount calculator in Embodiment 1.
Figure 4A:
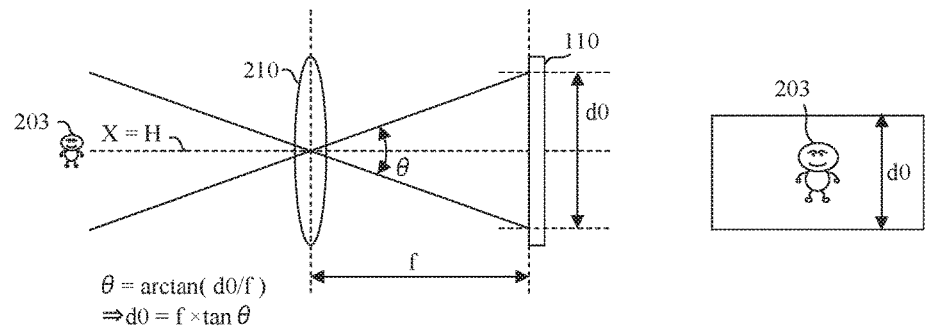
FIGS. 4A and 4B illustrate the object displacement amount calculating process in Embodiment 1.
Figure 4B:
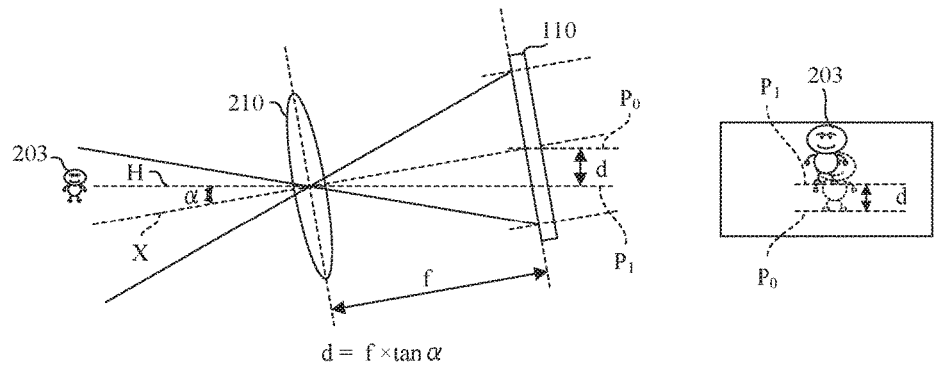
Figure 5:
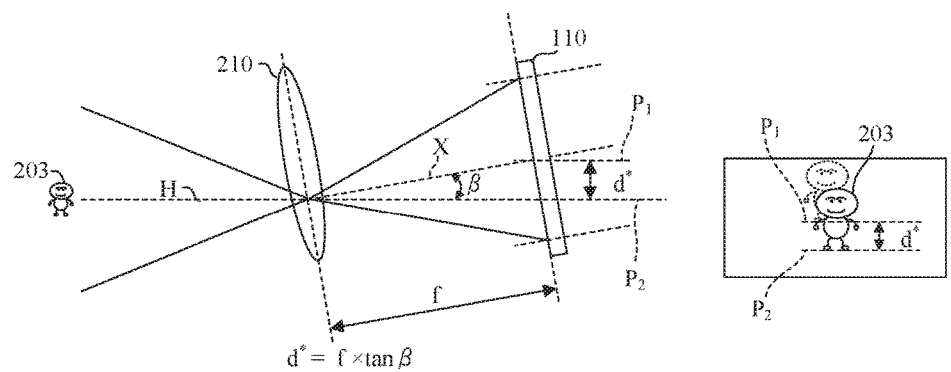
FIG. 5 illustrates the object displacement amount calculating process in an image blur correction in Embodiment 1.

Detailed description will be made of an object displacement amount calculation process performed by the displacement amount calculator 116 with referring to a flowchart of FIG. 3 and FIGS. 4 to 8. The displacement amount calculator 116 included in the microcomputer 102 performs this process according to an object displacement amount calculating program as a computer program. In FIG. 3 and the following description, step is abbreviated as S. At S100 in FIG. 3, the displacement amount calculator 116 calculates the displacement amount of the object image from the motion amount of the image capturing apparatus 100 to temporarily store the calculated displacement amount. FIGS. 4A, 4B and 5 illustrate a specific example.

FIG. 4A schematically illustrates a relation between the image capturing angle of view θ, the image capturing area d0 and an object 202 in a state where the optical axis X of the image capturing apparatus 100 (image capturing optical system) coincides with horizontal axis H. FIGS. 4A, 4B and 5 schematically illustrate the image capturing optical system by a single lens 210. The image capturing area d0 corresponds to a vertical area of the captured image. The angular velocity detected by the shake sensor 101 integrated to be converted to the angular motion amount (hereinafter referred to as "a shake angle").

The shake angle may be acquired by starting the integration from a time at which the FA zoom function becomes active and may be sequentially updated by performing the integration at predetermined time (for example, 1 second) intervals. The shake angle converted from the angular velocity detected by the shake sensor 101 is represented by α, a current focal length of the image capturing optical system is represented by f, and the displacement amount of the object image is represented by d. FIG. 4B schematically illustrates the displacement amount d of the object image in a state where the image capturing apparatus 100 is shook by the shake angle α. The optical axis X of the image capturing apparatus 100 is tilted with respect to the horizontal axis H by the shake angle α. In this state, the displacement amount d of the object image corresponds to a difference between a position P0 of the object image before the image capturing apparatus is shook (illustrated in FIG. 4A) and a position P1 of the object image after the image capturing apparatus is shook (illustrated in FIG. 4B).

The displacement amount d is calculated by using following expression (1):

$$d = f \times \tan \alpha \quad (1)$$

where tan α is a tangent function of the shake angle α.

The shift of the shift lens in the blur correction mechanism 108 reduces the displacement of the object image in the captured image, so that the displacement amount of the object image in the captured image is small with respect to the shake of the image capturing apparatus 100.

FIG. 5 schematically illustrates a correction amount β (in angles) provided by the shift of the shift lens in the blur correction mechanism 108 and the displacement amount d* of the object image corresponding to the correction amount β. The displacement amount d* of the object image corresponds to a difference between the position P1 of the object image after the image capturing apparatus is shook (illustrated in FIG. 4B) and a position P2 of the object image whose blur is corrected by the lens 210 being shifted (illustrated in FIG. 5). The displacement amount d* is calculated by using following expression (2):

$$d^* = f \times \tan(\alpha - \beta) \quad (2)$$

When a length corresponding to one pixel is represented by u, whose unit is, for example, mm/pixel, dividing the displacement amount d* of the object image by u to calculate d*/u converts a length unit into a pixel unit.

The unit of the displacement amount of the object image is not limited to a specific one, and however, in the following description, the pixel unit is selected as a unit of the motion vector and as the unit of the displacement amount. The image capturing apparatus 100 may be set in a state where the image blur correction is not performed. In this state, the correction amount β is zero. That is, this state can be expressed by expression (2). The following description includes such a case where the image blur correction is not performed.

At S101 in FIG. 3, the motion vector detector 125 determines whether or not the motion vector is detectable. Since the FA zoom is a function of preventing the main object that the user desires to capture from framing cut, this embodiment detects the motion vector indicating an actual displacement amount of the main object image in the captured image to determine the motion of the main object by using the motion vector. That is, when the motion vector is detectable, the determination is basically made by using the motion vector, and thereby the process proceeds to S102. When the motion vector is not detectable, the process proceeds to S104. The motion vector is not detectable in a case where a low contrast object prevents detecting a correct motion vector, a case where a large number of moving objects exist in the same image capturing area and thereby a motion vector of a specific object cannot be detected and a case where the shake amount of the image capturing apparatus in one frame is too large to detect the motion vector.

Figure 6A:
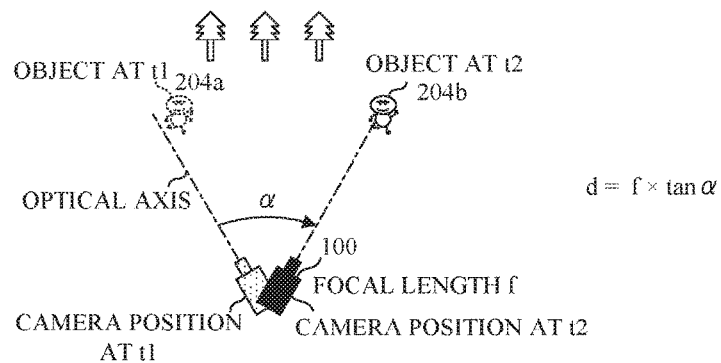
FIGS. 6A to 6C illustrate the object displacement amount calculating process using a motion vector in Embodiment 1.
Figure 6B:
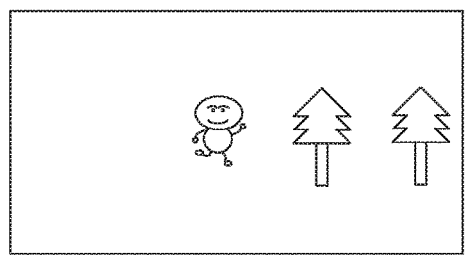
Figure 6C:
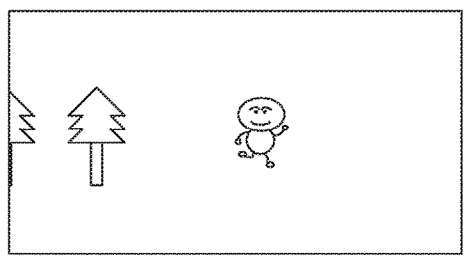
Figure 7A:
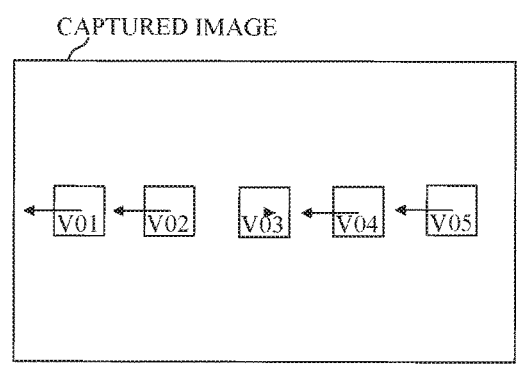
FIGS. 7A and 7B illustrate a motion vector detecting process and a histogram calculating process in Embodiment 1.

Description will be made of a main object motion vector calculation process performed at S102 with referring to FIGS. 6A to 6C, 7A and 7B. FIG. 6A illustrates a motion of the image capturing apparatus (camera) 100 and that of a main object 204 (204a and 204b). The main object 204 at a time t1 is denoted by reference numeral 204a, and the main object 204 at a time t2 is denoted by reference numeral 204b. FIG. 6A illustrates an image capturing state where the main object 204 moves from the time t1 to the time t2 and the user moves (pans) the image capturing apparatus 100 for following the main object 204 by the shake angle α from a camera position at the time t1 to a camera position at the time t2. FIG. 6B illustrates an example of a captured image at the time t1, and FIG. 6C illustrates an example of a captured image at the time t2. FIG. 7A illustrates an example of motion vectors V01 to V05 detected in five detection blocks set in the captured image.

Figure 7B:
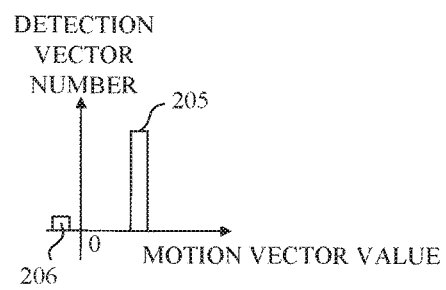

FIG. 7B illustrates an example of a histogram of the detected motion vectors. A horizontal axis indicates magnitudes of the motion vectors, and a vertical axis indicates numbers of the detected motion vectors (detected vector numbers). The output from the motion vector detector 125 includes motion vectors of the main object 204 and motion vectors of a background, so that the motion vector detector 125 classifies the motion vectors by using the histogram illustrated in FIG. 7B. The motion vector detector 125 calculates, using data of the captured images at the time t1 and t2, the motion vectors V01 to V05 in the respective detection blocks. The motion vector detector 125 further produces, from the detected motion vectors, the histogram illustrated in FIG. 7B. FIG. 7B illustrates first motion vectors 205 whose detected vector number is larger and second motion vectors 206 whose detected vector number is smaller. The motion vector whose magnitude is approximately as large as the displacement amount d* of the object image calculated from the motion amount of the image capturing apparatus 100 can be determined as corresponding to an image motion due to the motion of the image capturing apparatus 100, that is, the motion vectors of the background. In FIG. 7B, since the magnitude of each of the first motion vectors 205 whose detected vector number is larger is close to the displacement amount d of the object image, the first motion vectors 205 are regarded as the motion vectors of the background. Thus, the motion vector of the main object 204 are determined by removing the motion vectors of the background (first motion vectors 205) from all the motion vectors and by extracting, from the remaining motion vectors, motion vectors whose detected vector number is largest. In FIG. 7B, the magnification of each of the second motion vectors 206 is regarded as the magnification of the motion vector of the main object 204. The magnitude of the detected motion vector of the main object 204 is denoted by v.

At S103 in FIG. 3, the displacement amount calculator 116 replaces the displacement amount of the object image with the magnitude v of the motion vector of the main object calculated at S102. That is, when the motion vector detectable, the displacement amount calculator 116 updates the displacement amount of the object image stored at S100 with the motion vector of the main object. Then, the process ends.

On the other hand, when the motion vector detector 125 determines that the motion vector is not detectable at S101, since the displacement amount of the main object image cannot be updated with the motion vector of the main object, the displacement amount calculator 116 sets, as a final displacement amount of the object image, the displacement amount of the object image calculated at S100 or the corrected displacement amount of the object image corrected by using the electronic zoom magnification. Thus, at S104, the displacement amount calculator 116 determines whether or not the electronic zoom control is being performed.

If the electronic zoom control is being performed, the process proceeds to S105. If the electronic zoom control is not being performed, the displacement amount calculator 116 sets the displacement amount d* of the object image calculated at S100 as the final displacement amount of the object image. Then, the process ends.

At S105, the displacement amount calculator 116 corrects the displacement amount d* of the object image calculated at S100 by using the electronic zoom magnification. This correction is expressed by following expression (3) where e represents the corrected displacement amount.

$$e = d^* \times \text{electronic zoom magnification} \quad (3)$$

Figure 8A:
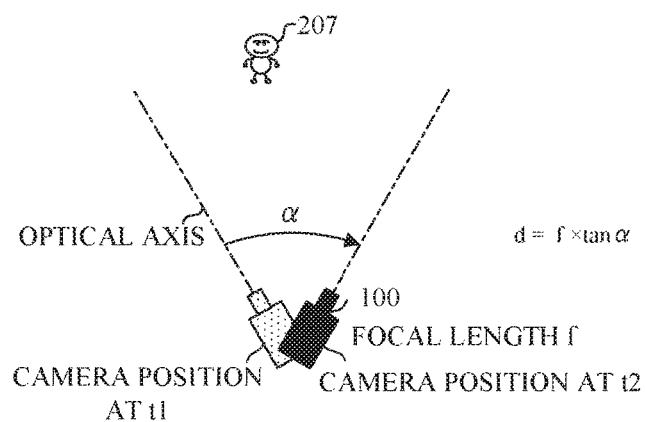
FIGS. 8A to 8C illustrate the object displacement amount calculating process performed when an electronic zoom is active in Embodiment 1.
Figures 8B, 8C:
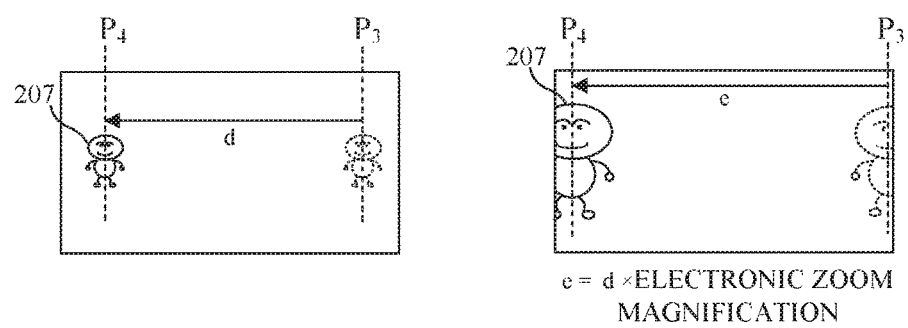

Description will be made of the process at S105 with referring to FIG. 8A to 8C. FIG. 8A illustrates as an example an image capturing state where a main object 207 moves from a time t1 to a time t2 and the user moves (pans) the image capturing apparatus 100 for capturing the main object 207 by the shake angle α from a camera position at the time t1 to a camera position at the time t2. When a displacement amount of an object image in a captured image with respect to a motion amount of the image capturing apparatus 100 is represented by d (when β=0, or d* when β≠0). The displacement amount d (or d*) of the object image corresponds to a difference between an object position at the time t1 and an object position at the time t2. FIG. 8B illustrates an example of a captured image when the electronic zoom control is not performed. On the other hand, FIG. 8C illustrates an example of a captured image when the electronic zoom control is performed. In the image capturing state illustrated in FIG. 8A, when the electronic zoom is not performed, the displacement amount of the object image in the captured image illustrated in FIG. 8B is d that is the difference between the object position P3 at the time t1 and the object position P4 at the time t2. On the other hand, when the electronic zoom control is performed, an electronic zoom process for image enlargement or image reduction is performed. Thus, as illustrated in FIG. 8C, the displacement amount of the object image in the captured image illustrated is e. That is, when the electronic zoom control is performed, the displacement amount of the object image in the captured image with respect to the same motion of the image capturing apparatus 100 changes depending on the electronic zoom magnification.

At S105, the displacement amount calculator 116 sets the displacement amount e of the object image corrected by using the electronic zoom magnification as the displacement amount of the object image. Then, the process ends. The correction expressed by expression (3) enables, even when the motion vector cannot be acquired, calculating the displacement amount of the object image from the motion amount of the image capturing apparatus 100 while taking account of the electronic zoom.

This embodiment performs, depending on the determination result based on the displacement amount of the object image in the captured image, the zooming assist control at appropriate timings according to the image capturing states.

Embodiment 2

Next, description will be made of Embodiment 2 of the present invention. This embodiment will also describe, as well as Embodiment 1, an image capturing apparatus including a zoom control apparatus configured to perform zoom control based on a displacement amount of an object image in a captured image. The zoom control apparatus in this embodiment is different from Embodiment 1 in that a microcomputer 202 includes a threshold acquire 228 and in that an object capture determiner 217 determines whether or not an object is being captured by using a threshold acquired by the threshold acquirer 228.

Figure 9:
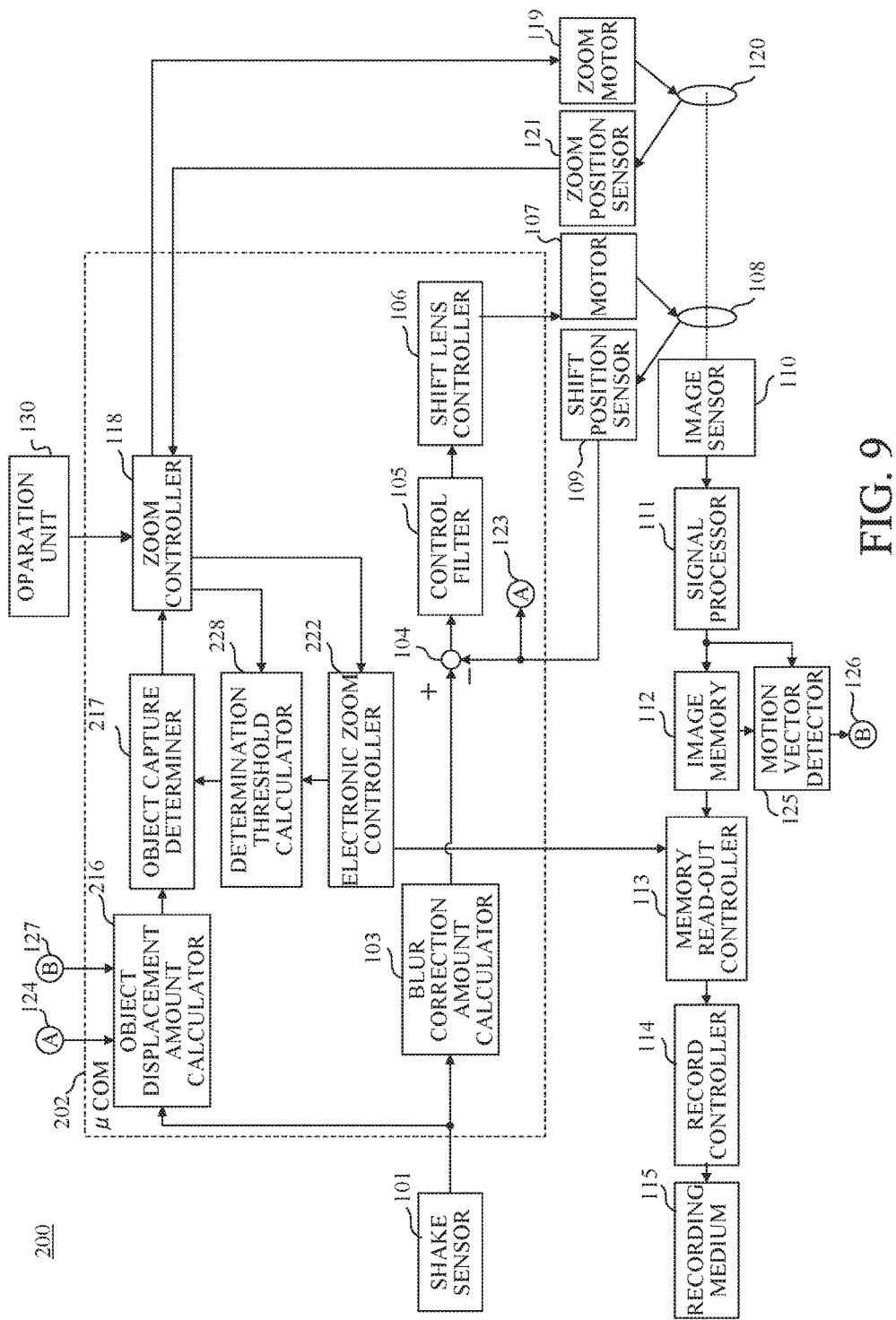
FIG. 9 is a block diagram illustrating a configuration of an image capturing apparatus that is Embodiment 2 of the present invention.

FIG. 9 illustrates the image capturing apparatus 200 having an FA zoom function in this embodiment. In the image capturing apparatus 200 of this embodiment, constituent components identical or similar to those of the image capturing apparatus 100 of Embodiment 1 are denoted by the same reference numerals as those in Embodiment 1 and description thereof is omitted. In this embodiment, description will be mainly made of differences from Embodiment 1.

As described above, in the image capturing apparatus 200 the microcomputer (μCOM) 202 includes the threshold acquirer 228. The displacement amount calculator 216 calculates the displacement amount of the object image from an output (angular velocity signal) from the shake sensor 101. Specifically, subtracting a value acquired by converting a blur correction amount in a blur correction mechanism. 108 into an angle, from a shake angle acquired by integrating the angular velocity signal from the shake sensor 101 calculates a displacement amount d2 of the object image in angles.

Although Embodiment 1 uses pixels as the unit of the displacement amount d* of the object image, a calculation method in this embodiment is basically the same as that Embodiment 1. This embodiment is different from Embodiment 1 in that, instead of acquiring the displacement amount of the object image in lengths (whose unit is pixel), acquiring the displacement amount of the object image in angles. However, this embodiment may acquire the displacement amount of the object image in pixels as well as Embodiment 1, and Embodiment 1 may acquire the displacement amount of the object image in angles.

The displacement amount d2 of the object image is input to the object capture determiner 217. The object capture determiner (hereinafter simply referred to as "a capture determiner") 217 determines, depending on the displacement amount d2 of the object image and motion vectors detected by a motion vector detector 125, an object capturing state indicating whether or not the object is being captured. The motion vectors detected by the motion vector detector 125 are input to the capture determiner 217 via B terminals 126 and 127 electrically connected to each other.

As is the case in Embodiment 1, the determination process using the motion vector determines the object capturing state using the motion vector of the main object, and however, the threshold acquirer 228 calculates the threshold using information from the zoom controller 218, which is different from Embodiment 1. The threshold acquired by the threshold acquirer 228 is a threshold (determination threshold) for determining the object capturing state relating to the displacement amount d2 of the object image.

Figure 10A:
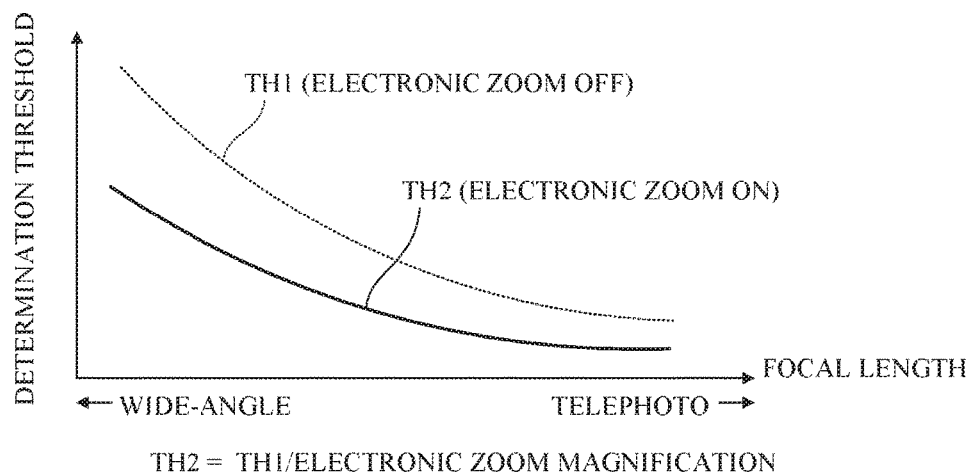
FIGS. 10A and 10B illustrate a threshold calculating process performed when an electronic zoom is active in Embodiment 2.

FIG. 10A illustrates, as an example, determination thresholds with respect to focal lengths of an image capturing optical system, when an electronic zoom control is active and when the electronic zoom control is inactive. A horizontal axis indicates the focal lengths of the image capturing optical system, and a vertical axis indicates the determination thresholds. In this example, the horizontal axis indicates the focal lengths. However, the horizontal axis may indicate distances from the image capturing apparatus to the object.

The determination threshold for when the electronic zoom control is not performed (electronic zoom OFF) by the electronic zoom controller 222 is denoted by TH1, which is illustrated by a dotted line.

The determination threshold for when the electronic zoom control is performed (electronic zoom ON) by the electronic zoom controller 222 is denoted by TH2, which is illustrated by a solid line. In this embodiment, a process is performed that changes the determination threshold depending on the focal length such that the zoom out is activated by a smaller motion amount of the image capturing apparatus in a telephoto state than that in a wide-angle state. In FIG. 10A, a relation of TH2<TH1 is established for the same focal lengths. When the electronic zoom control is performed (an electronic zoom magnification is larger than 1), the displacement amount of the object image in the captured image is larger than that when the electronic zoom control is not performed (the electronic zoom magnification is 1) with respect to the same motion amount of the image capturing apparatus. Therefore, when the electronic zoom magnification is larger than 1, setting the determination threshold to be smaller than that for when the electronic zoom magnification is 1 makes it easy to activate the zoom out. Specifically, as expressed by following expression (4), a value calculated by dividing the determination threshold TH1 by the electronic zoom magnification is set as the determination threshold TH2.

$$TH2 = TH1/\text{electronic zoom magnification} \quad (4)$$

The determination threshold TH2 may be set for various electronic zoom magnifications to be stored in a memory included in the threshold acquirer 228 and may be acquired by reading the determination thresholds TH2 therefrom. Alternatively, the determination threshold TH2 may be calculated using the determination threshold TH1 stored in the memory and the electronic zoom magnification.

When the electronic zoom control is performed, the zoom out is activated in response to the displacement amount d2 of the object image exceeding the determination threshold TH2. The determination thresholds TH1 and TH2 are each a first threshold used for determining whether or not to perform the FA zoom out. Thereafter, in response to the displacement amount d2 of the object image decreasing below a capturing threshold TH3, the zoom in control is started to return the focal length to an original telephoto one.

Figure 10B:
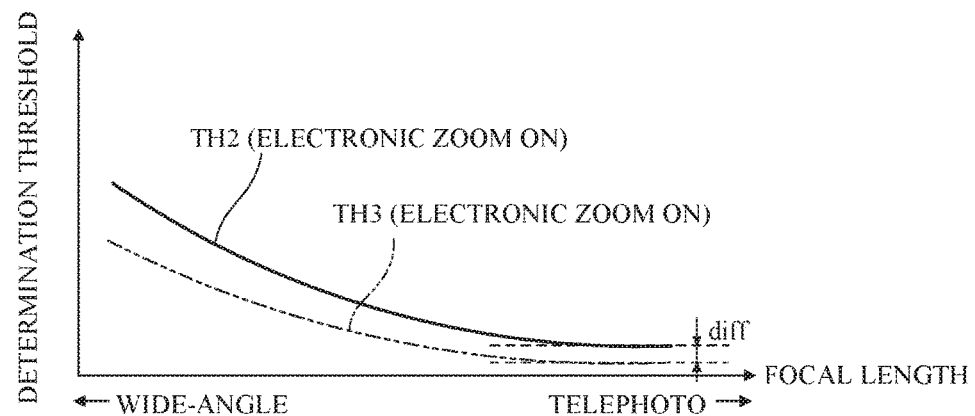

The capturing threshold F3 is a threshold for determining that the object image is included in the captured image, that is, the image capturing apparatus is capturing the object. When the displacement amount d2 of the object image is smaller than the capturing threshold 13, it is determined that the object image is included in the captured image, that is, the image capturing apparatus is capturing the object in other words, the capturing threshold T3 is a threshold for determining whether or not to perform the FA zoom in. The capturing threshold T3 corresponds to a second threshold. FIG. 10B illustrates a limitation of the determination threshold TH2 when the electronic zoom control is performed. A horizontal axis indicates the focal lengths of the image capturing optical system (or distances from the image capturing apparatus to the object), and a vertical axis indicates the determination thresholds. In FIG. 10B, a relation of TH3<TH2 is established for the same focal lengths, and diff represents a difference between. TH2 and TH3. The capturing threshold TH3 also changes depending on whether or not the electronic zoom control is performed. Description of the capturing threshold for when the electronic zoom control is not performed is omitted.

Reducing the determination threshold TH2 by the electronic zoom magnification reduces the difference diff from the capturing threshold TH3. A too small difference diff causes the following problem relating to the FA zoom. When the zoom out is activated in response to the displacement amount d2 slightly exceeding the determination threshold TH2, immediately thereafter, only a slight decrease in the displacement amount d2 to a value below the capturing threshold TH3 starts the zoom in. That is, a hunting phenomenon in which the zoom out and the zoom in are frequently caused is generated, which may make it hard to see the captured image. Thus, this embodiment limits the determination threshold. TH2 such that the difference diff does not become smaller than a predetermined value (lower limit) even though the focal length is varied.

The predetermined value is specifically a value corresponding to a motion amount when the user performs a fixed point image capturing such that the image capturing apparatus 100 is fixed. The reason for limiting the determination threshold TH2 is to prevent the displacement amount d2 from exceeding the determination threshold (first threshold) TH2 or decreasing below the capturing threshold (second threshold) TH3.

As described above, this embodiment performs the process to change the determination threshold used for determining the object capturing state and enables performing the zooming assist control depending on the comparison result between the displacement amount of the object image in the capturing image and the changed determination threshold. Although this embodiment changes the determination threshold depending on whether or not the electronic zoom control is performed, a similar effect can be provided by correcting the magnification v of the motion vector of the main object by the capture determiner 217 and then comparing the corrected magnification with the determination threshold. Furthermore, although this embodiment changes the determination threshold depending on both the focal length (optical zoom magnification) and the electronic zoom magnification, the determination threshold may be changed depending on one of the focal length and the electronic zoom magnification. Changing the determination threshold depending on both the focal length and the electronic zoom magnification enables performing the zoom control according to the user's intention as compared to the case of changing the determination threshold depending on one of the focal length and the electronic zoom magnification. On the other hand, changing the determination threshold depending on one of the focal length and the electronic zoom magnification enables reducing an amount of data to be stored and an amount of calculation.

Embodiment 3

Next, description will be made of Embodiment 3 of the present invention. This embodiment will describe an image capturing apparatus including a zoom control apparatus configured to perform an FA zoom out when a motion of the image capturing apparatus is large. When performing the FA zoom out in response to the motion of the image capturing apparatus, it is desirable to distinguish a motion thereof for searching for an object (that is, panning) from a motion thereof due to hand jiggling and to perform the FA zoom out when the panning is made. This embodiment distinguishes, by using a first value (velocity or acceleration) relating to the motion of the image capturing apparatus and a second value that is a motion amount thereof to set a reference position for acquiring a shake angle by using the acceleration, a large motion of the image capturing apparatus corresponding to the panning from a small motion thereof due to the hand jiggling. The velocity includes an angular velocity, the acceleration includes an angular acceleration, and the motion amount includes a shake angle. This embodiment acquires the angular velocity as the first value by using a shake sensor configured to detect the angular velocity and acquires the shake angle as the second value by integrating the angular velocity.

Figure 11:
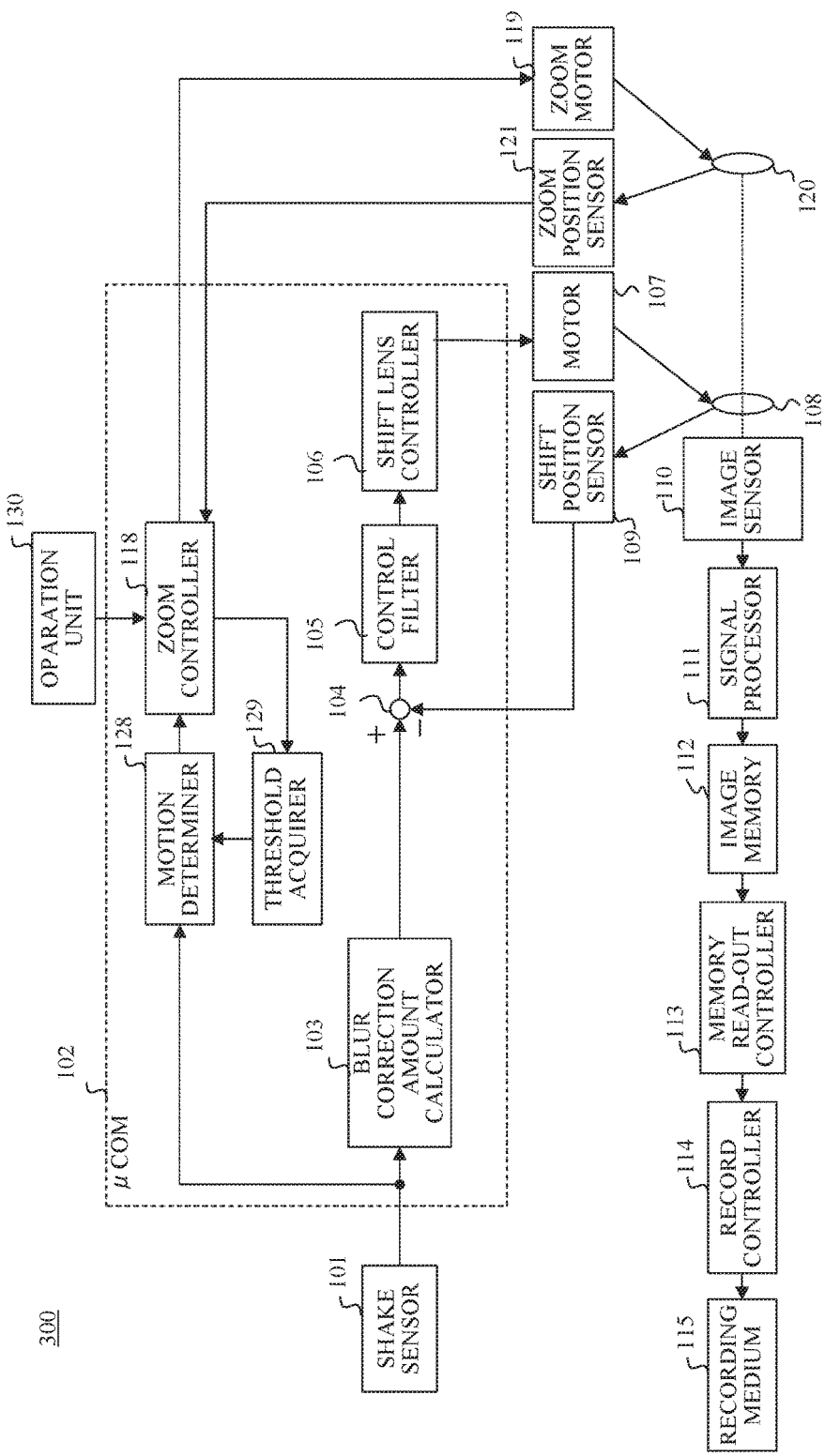
FIG. 11 is a block diagram illustrating a configuration of an image capturing apparatus that is Embodiment 3 of the present invention.

FIG. 11 illustrates an image capturing apparatus 300 of this embodiment having an FA zoom function. In the image capturing apparatus 300 of this embodiment, constituent components identical or similar to those of the image capturing apparatus 100 of Embodiment 1 are denoted by the same reference numerals as those in Embodiment 1 and description thereof is omitted. In this embodiment, description will be mainly made of differences from Embodiment 1.

A microcomputer 102 in the image capturing apparatus 300 of this embodiment includes a motion determiner 128 and a threshold acquirer 129. Whether or not to perform a zoom out by the FA zoom function is determined by the motion determiner 128 and the threshold acquirer 129. The motion determiner 128 determines, by using the angular velocity acquired from the shake sensor 101 and the shake angle α acquired by integrating the angular velocity, whether or not a user is performing an operation (panning) for changing a direction of the image capturing apparatus 300 so as to search for an object. The panning is an operation to move the image capturing apparatus so as to horizontally change the direction thereof. However, in this embodiment, the panning includes a tilting that is an operation to move the image capturing apparatus so as to vertically change the direction thereof.

In general, a user who loses an object largely moves his/her image capturing apparatus for searching for the object. The motion determiner 128 determines, when the angular velocity and the shake angle α (angular motion amount) are larger than a predetermined determination threshold (an angular velocity threshold and/or an angular motion threshold described later), that, the user is moving the image capturing apparatus 300 for searching for the object. Conversely, when the user is stably capturing the object, the motion of the image capturing apparatus is small. Thus, the motion determiner 128 determines, when at least one of the angular velocity and the shake angle α is smaller than the corresponding determination threshold, that the user is not searching for the object, i.e., the user is capturing the object in an image capturing area. The determination thresholds are determined by the threshold acquirer 129. A relation between the angular velocity and shake angle α and the determination thresholds will be described later in detail. The shake sensor 101 configured to detect the angular velocity and the motion determiner 128 configured to acquire the determination thresholds from the threshold acquirer 129 constitute a motion detector.

A zoom controller 118 supplies, in response to receipt of the determination result from the motion determiner 128, drive signals for performing the FA zoom out and the FA zoom in to a zoom motor 119. The zoom controller 116 and the motion determiner 128 constitute a view angle changer. The shake sensor 101 and the microcomputer 102 (including the motion determiner 128 and the zoom controller 118) constitute the zoom control apparatus.

The threshold acquirer 129 acquires the determination thresholds depending on a current focal length (zoom position) acquired from the zoom controller 118. Also in this embodiment, as well as in Embodiment 2, the determination threshold for a telephoto side is set to be smaller than that for a wide-angle side. This embodiment does not take account of an electronic zoom control, so that the determination threshold is set depending on the focal length (that is, the threshold TH1 in Embodiment 2 is used). However, when the FA zoom out is activated during the electronic zoom control, it is desirable to use the threshold TH2 in Embodiment 2 that is set depending on the electronic zoom magnification and the focal length.

Figure 12:
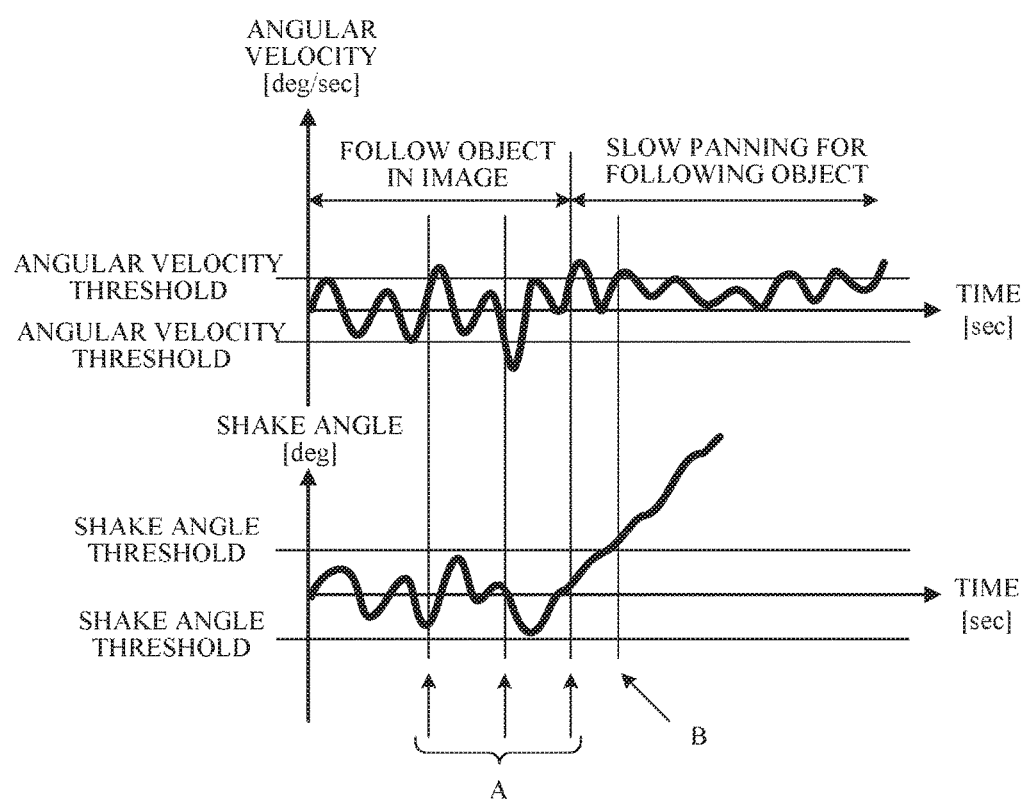
FIG. 12 illustrates variations of an angular velocity and an angular motion amount in a comparative example.
Figure 13A:
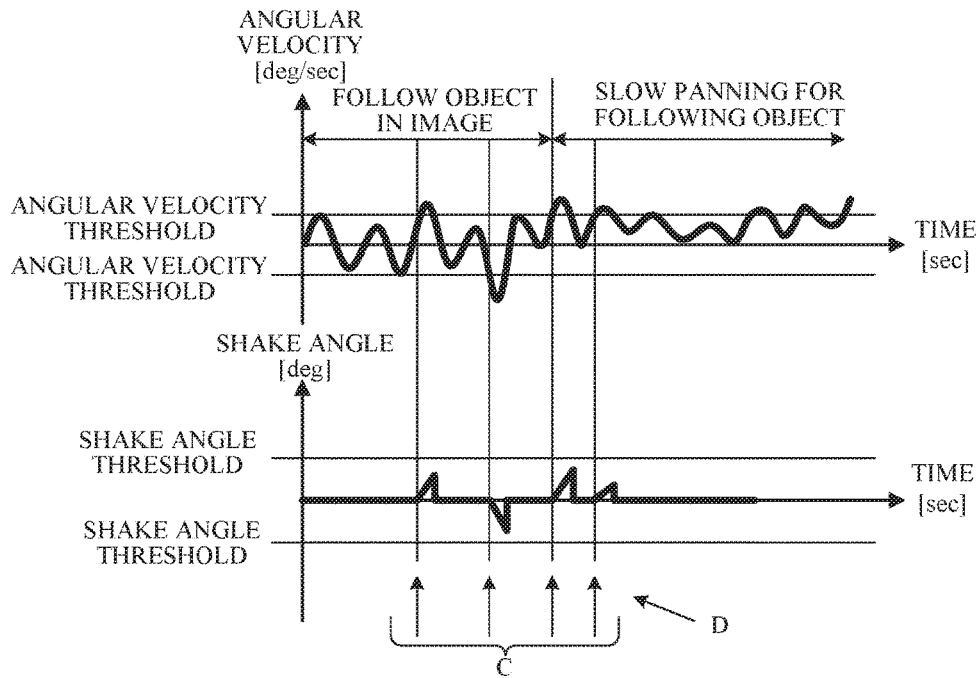
FIGS. 13A and 13B illustrate variations of the angular velocity and the angular motion amount in Embodiment 3.
Figure 13B:
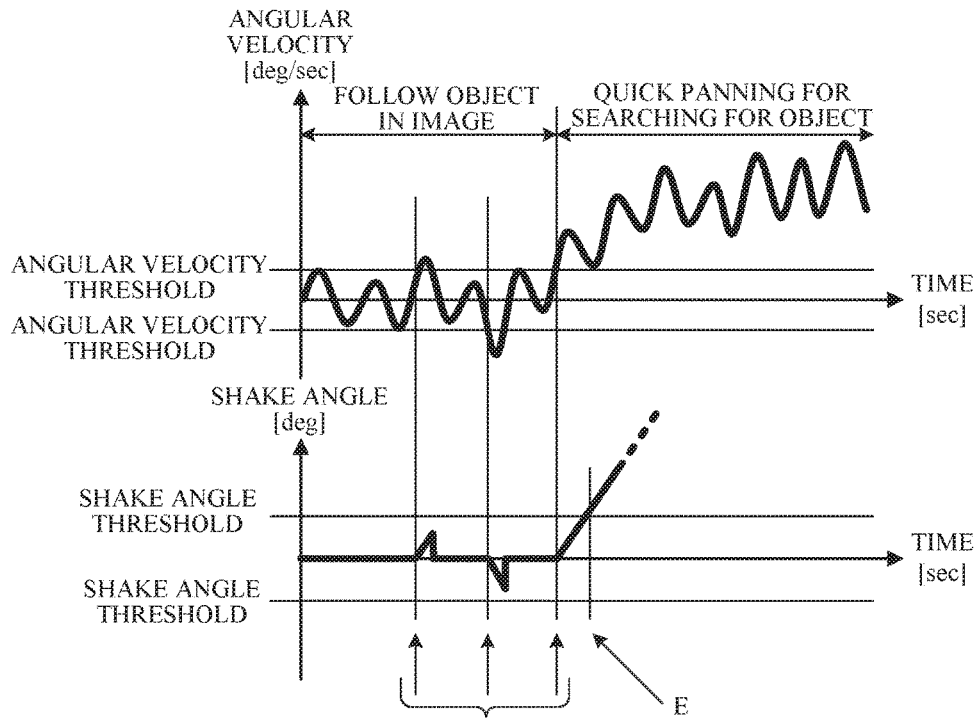

Next, description will be made of the relation between the angular velocity and shake angle α of the image capturing apparatus 300 and the determination thresholds for determining whether or not to activate the FA zoom out. FIGS. 12, 13A and 13B illustrate examples of the angular velocities and the shake angles α while the panning is performed to follow a moving main object from a state where the object is captured in the image capturing area (angle of view). Each of FIGS. 12, 13A and 13B illustrates a relation between the determination threshold (hereinafter referred to also as "a third threshold" or "an angular velocity threshold") for the angular velocity and the detected angular velocity and a relation between the determination threshold (hereinafter referred to also as "a fourth threshold" or "a shake angle threshold") for the shake angle and the detected shake angle α. FIG. 12 illustrates a comparative example of changes of the angular velocity and the shake angle α acquired by integrating the angular velocity from a time point at which the object is captured in the mage capturing area (left end in the drawing).

In FIG. 12, while the object is captured in the mage capturing area before the panning is performed, the change of the shake angle α is small, and even when the angular velocity temporarily increases to become equal to or higher than the angular velocity threshold (time points A in FIG. 12), the shake angle α does not exceed the shake angle threshold and thereby the FA zoom out is not performed. Thereafter, when a slow panning is performed so as to follow the object, the shake angle α increases in one direction (a positive direction in FIG. 12) and then the shake angle α becomes equal to or larger than the shake angle threshold. In this state, when the angular velocity temporarily increases to become equal to or higher than the angular velocity threshold (a time point B in FIG. 12), the FA zoom out is performed even though the object is captured in the image capturing area.

On the other hand, as illustrated in FIG. 13A, this embodiment resets the shake angle α to 0 when the angular velocity is lower than the angular velocity threshold while the object is captured in the mage capturing area before the panning and starts integrating the angular velocity from each of time points (C in FIG. 13A) at which the angular velocity becomes equal to or higher than the angular velocity threshold to acquire the shake angle α.

Then, this embodiment resets the shake angle α to 0 when the angular velocity becomes lower than the angular velocity threshold. This is the same while a slow panning is performed thereafter. Since, while such a slow panning is performed, the angular velocity becomes equal to or higher than the angular velocity threshold for a short time, the shake angle α is reset to 0 before the shake angle α becomes larger than the angular velocity threshold. Consequently, it is possible to prevent the FA zoom out from being performed while the slow panning can follow the object.

On the other hand, n FIG. 13B illustrating this embodiment, as well as in FIG. 13A, when a quick panning for searching for a lost object is performed from the state where the object is captured in the image capturing area, the angular velocity becomes equal to or higher than the angular velocity threshold, and this state continues. As a result, this embodiment starts, from a time point of starting the search for the object, the integration of the angular velocity to acquire the shake angle α. The shake angle α becomes equal to or larger than the shake angle threshold at a time point E in FIG. 13B and thereby the FA zoom out is performed.

As described above, this embodiment starts the integration of the angular velocity for acquiring the shake angle α at the time point (reference position) at which angular velocity becomes equal to or higher than the angular velocity threshold. This control enables preventing the FA zoom out from being performed while a slow panning is performed and enables the FA zoom out to be performed while a quick panning is performed.

Figure 14:
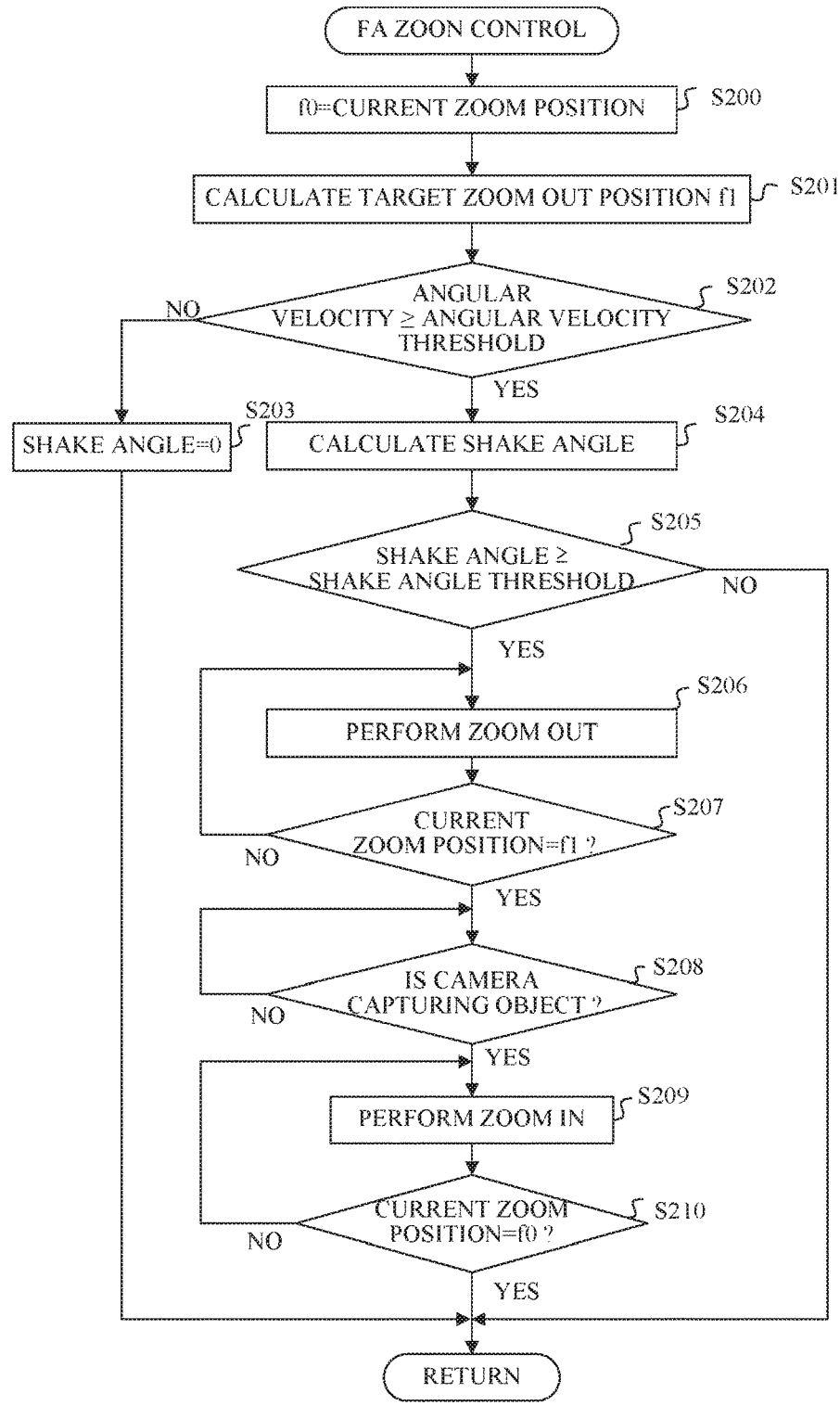
FIG. 14 is a flowchart illustrating a process in Embodiment 3.

FIG. 14 is a flowchart of an FA zoom control (view angle control) process performed by the microcomputer 102. The microcomputer 102 performs this process according to an FA zoom control program that is a computer program.

At step S200, the zoom controller 118 holds a current zoom position as a reference zoom position f0. This reference zoom position f0 is a target zoom position for performing the FA zoom in after performing the zoom out.

Next, at S201, the zoom controller 118 calculates a target zoom position (hereinafter referred to as "a target zoom out position") f1 for performing the FA zoom out. For example, when a zoom out amount of the FA zoom out is set to 1/n times as a focal length equivalent value, the target zoom out position f1 is f0/n. The value n for calculating the target zoom out position may be a predetermined fixed value or a user settable value that can be set by the user through a menu operation or the like. Furthermore, the zoom out amount may be set by a number of steps. In this case the zoom lens is moved by m steps to the wide-angle side. The value m may be a predetermined fixed value or a user settable value.

Next, at S202, the motion determiner 128 determines whether or not the angular velocity is equal to or higher than the angular velocity threshold. The process proceeds to S204 if the angular velocity is equal to or higher than the angular velocity threshold and otherwise proceeds to S203. At S203, the microcomputer 102 resets the shake angle α to 0 and ends this routine. Then, the process returns to S200.

Although in Embodiment 1 the blur correction amount calculator 103 acquires the shake angle (integrates the acceleration), in this embodiment, since the reference position of the shake angle used for the FA zoom function is different from that of the shake angle used for the blur correction, the motion determiner 128 acquires the shake angle used for the FA zoom function. However, this is merely an example and not a limitation. In this embodiment, the reference position of the shake angle used for the blur correction is a position of the image capturing apparatus (optical axis X) at a time point at which the blur correction function is activated (ON). On the other hand, the reference position of the shake angle used for the FA zoom function is a position corresponding to the time point at which the angular velocity becomes equal to or higher than the angular velocity threshold.

On the other hand, at S204, the zoom controller 118 calculates the shake angle α. Specifically, the zoom controller 118 integrates the angular velocity signal acquired from the shake sensor 101 to calculate the shake angle α. Furthermore, when the zoom controller 118 calculated the shake angle α at S204 in the previous routine, the zoom controller 118 accumulates the previously calculated shake angle α and the currently calculated shake angle α. This calculation enables acquiring the shake angle α with respect to the reference position where the optical axis X is located at the time point at which the angular velocity becomes equal to or higher than the angular velocity threshold (i.e., an integrated value of the angular velocity acquired by the integration starting from the time point at which the angular velocity becomes equal to or higher than the angular velocity threshold). The zoom controller 118 sets, when it calculated the shake angle α in the previous routine, the accumulated value of previously and currently calculated shake angles α as the shake angle α calculated at this step. On the other hand, the zoom controller 118 sets, when it proceeded from S202 to S203 and therefore did not calculate the shake angle α in the previous routine, the shake angle α that is a result of the current integration as the shake angle α calculated at this step. Then, the process proceeds to S205.

At S205, the motion determiner 128 determines whether or not the shake angle (accumulated value) α is equal to or larger than the shake angle threshold, that is, whether or not a quick panning is performed such that the user searches for the object. The zoom controller 118 proceeds to S206 if the shake angle α is equal to or larger than the shake angle threshold. The zoom controller 118 returns to S200 without performing the FA zoom out if the shake angle α is smaller than the shake angle threshold; this is because the object is captured in the image capturing area.

At S206, the zoom controller 118 performs the FA zoom out toward the target zoom out position f1 calculated at S201. Then, at S207, the zoom controller 118 determines whether or not the current zoom position has reached the target zoom out position f1. The zoom controller 118 returns, if the current zoom position has not reached the target zoom out position f1, to S206 to continue the FA zoom out. The zoom controller 118 proceeds to S208 if the current zoom position has reached the target zoom out position f1.

At S208, the zoom controller 118 causes the motion determiner 128 to determine whether the object is captured in the image capturing area or a quick panning is performed so as to search for the object. The zoom controller 118 proceeds to S209 if the object is captured in the image capturing area. The zoom controller 118 repeats this step while keeping the zoom position at f1 if the quick panning is performed so as to search for the object.

At S209, the zoom controller 118 performs the FA zoom in toward the reference zoom position f0 held at S200.

At S210, the zoom controller 118 determines whether or not the current zoom position has reached the reference zoom position f0 and continues the FA zoom in if the current zoom position has not reached the reference zoom position 10. On the other hand, if the current zoom position has reached the reference zoom position f0, the zoom controller 118 ends the current routine to return to S200.

After the FA zoom in is ended, the zoom controller 118 may change the value n (or m) used for calculating the target zoom out position. Furthermore, when the user does not varies the image capturing angle of view through the zoom key operation, the zoom controller 118 may hold the reference zoom position f0 and the target zoom out position f1 and start the next routine from S202.

As described above, this embodiment uses as the shake angle the integrated value of the angular velocity from the time point at which the angular velocity becomes equal to or higher than the angular velocity threshold and resets the shake angle at the time point at which the angular velocity becomes lower than the angular velocity threshold. This embodiment further performs the FA zoom out when the angular velocity becomes larger than the angular velocity threshold. This control enables preventing the FA zoom out from being performed when the image capturing apparatus is slowly moved while capturing the object in the image capturing area (captured image) and enables performing the FA zoom out when the image capturing apparatus is quickly and largely moved so as to search for the object moving outside the image capturing area.

Although this embodiment uses 0 as the reference value of the shake angle (hereinafter referred to as "a shake angle reference value"), an alternative embodiment (modified example) described below uses as the shake angle reference value a shake angle in a predetermined time period while the angular velocity is lower than the angular velocity threshold.

Figure 15:
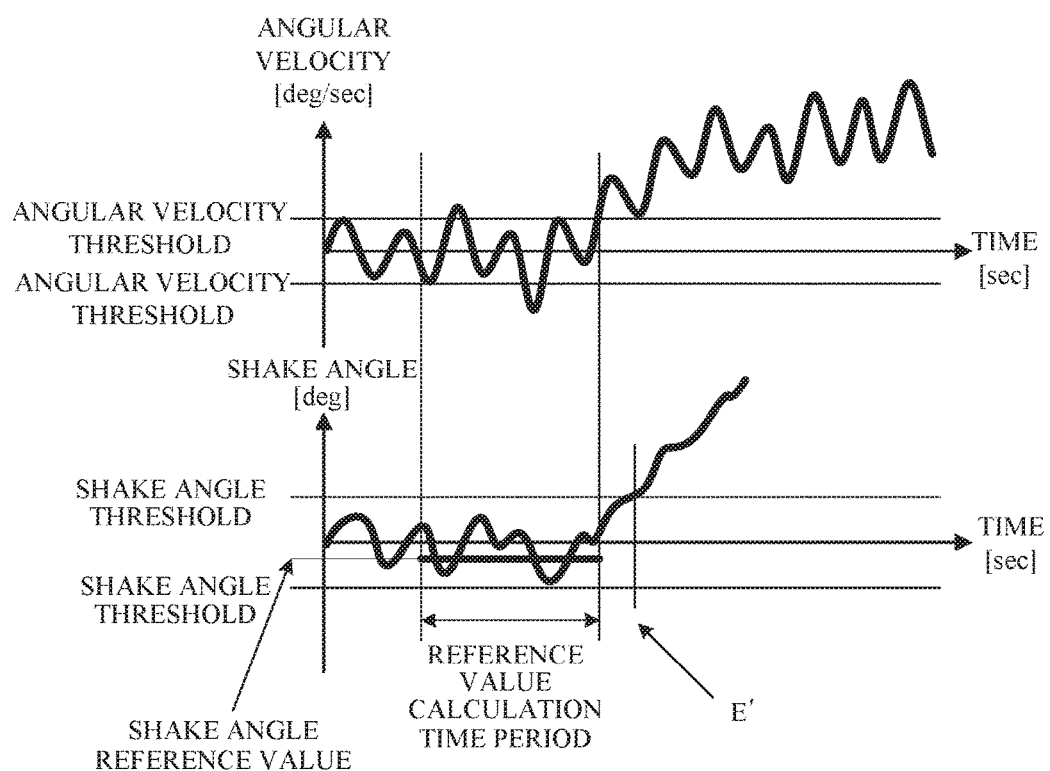
FIG. 15 illustrates a method of calculating a reference value of the angular motion amount in a modified example of Embodiment 3.

FIG. 15 illustrates the shake angle reference value that is an average value of the shake angles in the predetermined time period (hereinafter referred to as "a reference value calculation time period") while the angular velocity is lower than the angular velocity threshold. The zoom controller 118 calculates the shake angle from the shake angle reference value in a state where the angular velocity is equal to or higher than the angular velocity threshold and performs the FA zoom out when the angular velocity becomes higher than the angular velocity threshold. The shake angle from the shake angle reference value can be acquired by taking a difference between the shake angle with respect to 0 that is the reference value in the above embodiment and the shake angle reference value in this modified example. The reference value calculation time period may be appropriately set, for example, 1 second.

While the object is captured in the image capturing area without the panning (and while the object is captured in the image capturing area with a slow panning, which is not illustrated), the angular velocity becomes higher than the angular velocity threshold only for a short time. Thus, each lower angular velocity than the angular velocity threshold is averaged with the previous angular velocity, so that the averaged angular velocity is always lower than the angular velocity threshold. Accordingly, the PA zoom out can be prevented from being performed in a state where the slow panning can follow the object.

On the other hand, as illustrated in FIG. 15, a quick panning for searching for a lost object causes the angular velocity to exceed the angular velocity threshold and causes this state to continue. As a result, the shake angle with respect to the shake angle reference value exceeds the shake angle threshold. In this case, the FA zoom out is performed. As just described, using the shake angle with respect to the average value of the shake angles in the reference value calculation time period as the shake angle reference value also enables preventing the FA zoom out from being performed when the slow panning is performed and enables performing the FA zoom out when the quick panning is performed.

In addition, using as the shake angle reference value the average value of the shake angles in the reference value calculation time period enables acquiring an average shake angle in a predetermined stop time period before the panning as the shake angle reference value, so that a change of the shake angle due to the panning can be determined with higher accuracy.

Although this embodiment determines the motion of the image capturing apparatus using the angular velocity and the shake angle, an angular acceleration may be used instead of the angular velocity. Moreover, instead of using the shake sensor, a configuration may be employed that detects motion vectors from multiple consecutive frame images and acquires the angular velocity (or angular acceleration) and the shake angle from the motion vectors or that acquires a velocity, an acceleration and a displacement amount of a main object image from the motion vectors.

Embodiment 4

A fourth embodiment (Embodiment 4) of the present invention corresponds to a combination of Embodiments 1 and 3. This embodiment is different from Embodiment 1 in the method acquiring the displacement amount of the object image when the determination is made that the motion vectors is not detectable at S101 in the flowchart of FIG. 3. In this embodiment, when the determination is made that the motion vectors is not detectable, the zoom controller 118 acquires, as in Embodiment 3, the shake angle by integrating the angular velocity from the starting time point at which the angular velocity becomes equal to or higher than the angular velocity threshold and acquires the displacement amount d* of the object image by using the acquired shake angle as α in expression (2). The zoom controller 118 further resets, as in Embodiment 3, the shake angle to 0 (or to the calculated shake angle reference value) when the angular velocity becomes lower than the angular velocity threshold. While the electronic zoom is performed (the electronic zoom magnification is not 1), the shake angle is corrected by using the electronic zoom magnification as in Embodiment 1.

The present invention is not limited to these embodiments and various variations and modifications may be made without departing from the scope of the present invention. That is, the image capturing apparatus may be a combination of multiple apparatuses such as a lens-interchangeable camera body and an interchangeable lens detachably attachable to the camera body. The interchangeable lens may include the above-described microcomputer, shake sensor, blur correction mechanism and zoom lens.

Moreover, although the above embodiments described the example of using the motion vector for calculating the displacement amount of the main object image, alternative embodiments may calculate the displacement amount of the main object image by using other methods such as object recognition and face detection.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions or one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-246407, filed on Dec. 17, 2015, 2015-243958, filed on Dec. 15, 2015 and 2016-229830, filed on Nov. 28, 2016 which are hereby incorporated by reference herein in their entirety.

What is claimed is:

1. A zoom control apparatus configured to control an angle of view, the apparatus comprising:
a motion sensor configured to acquire a motion amount of an image capturing optical system used for image capturing of a main object; and
at least one processor or at least one circuit programmed to function as:
an image blur corrector configured to correct a blur of a captured image;
a calculator configured to calculate a difference between a correction amount by the image blur corrector and the motion amount of the image capturing optical system and to calculate a displacement amount of a main object image in the captured image by using the calculated difference;
a determiner configured to determine whether or not the displacement amount of the main object image is larger than a first threshold; and
a controller configured to perform, when the displacement amount of the main object image is larger than the first threshold, control for making the angle of view wider than that for when the displacement amount of the main object image is smaller than the first threshold.

2. A zoom control apparatus according to claim 1, wherein the at least one processor or at least one circuit is further programmed to function as an electronic zoom controller configured to perform image processing to vary an electronic zoom magnification,
wherein, the calculator is configured to, when the electronic zoom magnification is varied by the electronic zoom controller, corrects the displacement amount of the main object image by using the electronic zoom magnification and calculates the corrected displacement amount as the displacement amount of the main object image.

3. A zoom control apparatus according to claim 1, wherein the at least one processor or at least one circuit is further programmed to function as a detector configured to detect a motion vector from images captured at mutually different times, and
wherein the calculator is configured to, when the motion vector of the main object image is detected by the detector, calculate the displacement amount of the main object image by using the detected motion vector and configured to, when the motion vector of the main object image is not detected by the detector, calculate the displacement amount of the main object image by using the calculated difference.

4. A zoom control apparatus according to claim 1, wherein the first threshold is changed depending on at least one of a focal length of the image capturing optical system and an object distance to the main object.

5. A zoom control apparatus according to claim 4, wherein the first threshold for a first focal length of the image capturing optical system is set to be smaller than that for a second focal length, and wherein the first focal length is loner than the second focal length.

6. A zoom control apparatus according to claim 4, wherein the at least one processor or at least one circuit is further programmed to function as an electronic zoom controller configured to perform image processing to vary an electronic zoom magnification,
wherein the first threshold is changed depending on the electronic zoom magnification.

7. A zoom control apparatus according to claim 1, wherein the controller is configured to, when the displacement amount of the object image is larger than the first threshold, perform a zoom-out control for making the angle of view wider and configured to, when during the zoom-out control the displacement amount of the object image becomes smaller than a second threshold, perform a zoom-in control for making the angle of view narrower.

8. A zoom control apparatus according to claim 7, wherein the at least one processor or at least one circuit is further programmed to function as:
a threshold acquirer configured to acquire the first and second thresholds depending on at least one of a focal length of the image capturing optical system and an object distance to the main object; and
an electronic zoom controller configured to perform image processing to vary an electronic zoom magnification, wherein the threshold acquirer is configured to, when the electronic zoom magnification is larger than 1, acquire the first and second thresholds whose difference therebetween is a predetermined value or more.

9. A zoom control apparatus according to claim 1, wherein:
the motion sensor is configured to acquire a first value relating to a motion of the image capturing optical system, the first value being at least one of a velocity and an acceleration of the motion of the image capturing optical system;
the calculator is configured to acquire a second value relating to a moved amount of the motion of the image capturing optical system from a time at which the first value becomes equal to or higher than a third threshold and configured to acquire the displacement amount of the main object image by using the second value; and
the calculator is configured to reset the second value at a time at which the first value becomes lower than the third threshold and acquire the second value again with reference to a time at which the first value becomes equal to or higher than the third threshold again.

10. A zoom control apparatus according to claim 9, wherein the at least one processor or at least one circuit is further programmed to function as a detector configured to detect a motion vector from images captured at mutually different times, wherein the calculator is configured to, when the motion vector of the main object image is detected by the detector, calculate the displacement amount of the main object image by using the detected motion vector and configured to, when the motion vector of the main object image is not detected by the detector, calculate the displacement amount of the main object image by using the second value.

11. A zoom control apparatus according to claim 4, wherein the first threshold for a second object distance to main object is set to be smaller than that for a second object distance, wherein the first object distance is longer than the second object distance.

12. A zoom control apparatus configured to control an angle of view, the apparatus comprising:
a motion sensor configured to acquire a motion amount of an image capturing optical system; and
at least one processor or at least one circuit programmed to function as:
a controller configured to vary the angle of view,
wherein the controller is configured to (a) acquire a first value that is a velocity or an acceleration as a value relating to the motion amount, (b) acquire a second value that is a value relating to a moved amount of a motion of the image capturing optical system from a time at which the first value becomes equal to or higher than a third threshold and (c) make the angle of view wider in response to the second value becoming equal to or larger than a fourth threshold.

13. A zoom control apparatus according to claim 12, wherein the controller is configured to reset the second value at a time at which the first value becomes lower than the third threshold and acquire the second value again with reference to a time at which the first value becomes equal to or higher than the third threshold again.

14. A zoom control apparatus according to claim 12, wherein the controller is configured to acquire the second value from the time at which the first value becomes equal to or higher than the third threshold, with respect to a reference value that is an average value of the second values in a predetermined time period during which the first value is lower than the third threshold.

15. A zoom control apparatus according to claim 12, wherein the first value is an angular velocity or an angular acceleration, and the second value is a shake angle.

16. An image capturing apparatus comprising:
a zoom control apparatus configured to control an angle of view; and
an image sensor configured to perform image capturing with the angle of view,
wherein the zoom control apparatus comprises:
a motion sensor configured to acquire a motion amount of an image capturing optical system used for image capturing of a main object;
at least one processor or at least one circuit programmed to function as:
an image blur corrector configured to correct a blur of a captured image;
a calculator configured to calculate a difference between a correction amount by the image blur corrector and the motion amount of the image capturing optical system and to calculate a displacement amount of a main object image in the captured image by using the calculated difference;
a determiner configured to determine whether or not the displacement amount of the main object image is larger than a first threshold; and
a controller configured to perform, when the displacement amount of the main object image is larger than the first threshold, control for making the angle of view wider than that for when the displacement amount of the main object image is smaller than the first threshold.

17. An image capturing apparatus according to claim 16, further comprising an image capturing optical system whose angle of view is varied by the zoom control apparatus.

18. An image capturing apparatus comprising:
a zoom control apparatus configured to control an angle of view; and
an image sensor configured to perform image capturing with the angle of view,
wherein the zoom control apparatus comprises:
a motion sensor configured to acquire a motion amount of an image capturing optical system used for image capturing of a main object;
at least one processor or at least one circuit programmed to function as:
a detector configured to detect a motion vector from images captured at mutually different times;
a calculator configured to, when the motion vector of the main object image is detected by the detector, calculate a displacement amount of the main object image in a captured image by using the detected motion vector and configured to, when the motion vector of the main object image is not detected by the detector, calculate the displacement amount of the main object image in a captured image by using the motion amount of the image capturing optical system;
a determiner configured to determine whether or not the displacement amount of the main object image is larger than a first threshold; and
a controller configured to perform, when the displacement amount of the main object image is larger than the first threshold, control for making the angle of view wider than that for when the displacement amount of the main object image is smaller than the first threshold.

19. An image capturing apparatus according to claim 18, further comprising an image capturing optical system whose angle of view is varied by the zoom control apparatus.

20. A zoom control method of controlling an angle of view, the method comprising:
- a step of acquiring a motion amount of an image capturing optical system used for image capturing of a main object;
- a step of correcting a blur of a captured image;
- a step of calculating a difference between a correction amount in the step of correcting the blur and the motion amount of the image capturing optical system and of calculating a displacement amount of a main object image in the captured image by using the calculated difference;
- a step of determining whether or not the displacement amount of the main object image is larger than a first threshold; and
- a step of performing, when the displacement amount of the main object image is larger than the first threshold, control for making the angle of view wider than that for when the displacement amount of the main object image is smaller than the first threshold.

21. A zoom control apparatus configured to control an angle of view, the apparatus comprising:
- a motion sensor configured to acquire a motion amount of an image capturing optical system used for image capturing of a main object;
- and at least one processor or at least one circuit programmed to function as:
- a detector configured to detect a motion vector from images captured at mutually different times;
- a calculator configured to, when the motion vector of the main object image is detected by the detector, calculate a displacement amount of the main object image in a captured image by using the detected motion vector and configured to, when the motion vector of the main object image is not detected by the detector, calculate the displacement amount of the main object image in a captured image by using the motion amount of the image capturing optical system;
- a determiner configured to determine whether or not the displacement amount of the main object image is larger than a first threshold;
- and a controller configured to perform, when the displacement amount of the main object image is larger than the first threshold, control for making the angle of view wider than that for when the displacement amount of the main object image is smaller than the first threshold.

22. A zoom control apparatus according to claim 21, wherein the at least one processor or at least one circuit is further programmed to function as an electronic zoom controller configured to perform image processing to vary an electronic zoom magnification,
wherein, the calculator is configured to, when the electronic zoom magnification is varied by the electronic zoom controller, corrects the displacement amount of the main object image by using the electronic zoom magnification and calculates the corrected displacement amount as the displacement amount of the main object image.

23. A zoom control apparatus according to claim 21, wherein the controller is configured to, when the displacement amount of the object image is larger than the first threshold, perform a zoom-out control for making the angle of view wider and configured to, when during the zoom-out control the displacement amount of the object image becomes smaller than a second threshold, perform a zoom-in control for making the angle of view narrower.

24. A zoom control method of controlling an angle of view, the method comprising:
- a step of acquiring a motion amount of an image capturing optical system used for image capturing of a main object;
- a step of detecting a motion vector from images captured at mutually different times;
- a step of, when the motion vector of the main object image is detected by the detecting step, calculating a displacement amount of the main object image in a captured image by using the detected motion vector and of, when the motion vector of the main object image is not detected by the detecting step, calculating the displacement amount of the main object image in a captured image by using the motion amount of the image capturing optical system;
- a step of determining whether or not the displacement amount of the main object image is larger than a first threshold;
- and a step of performing, when the displacement amount of the main object image is larger than the first threshold, control for making the angle of view wider than that for when the displacement amount of the main object image is smaller than the first threshold.

* * * * *